United States Patent
Geng

(10) Patent No.: US 10,779,234 B2
(45) Date of Patent: Sep. 15, 2020

(54) TRANSMISSION MODE SWITCHING METHOD AND APPARATUS

(71) Applicant: Huawei Technologies Co., Ltd., Shenzhen (CN)

(72) Inventor: Tingting Geng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 16/233,897

(22) Filed: Dec. 27, 2018

(65) Prior Publication Data

US 2019/0132794 A1    May 2, 2019

Related U.S. Application Data

(63) Continuation of application No. PCT/CN2017/090625, filed on Jun. 28, 2017.

(30) Foreign Application Priority Data

Jun. 28, 2016  (CN) .......................... 2016 1 0489116

(51) Int. Cl.
*H04W 76/27* (2018.01)
*H04W 52/02* (2009.01)
*H04W 72/12* (2009.01)

(52) U.S. Cl.
CPC ....... *H04W 52/0225* (2013.01); *H04W 72/12* (2013.01); *H04W 76/27* (2018.02); *Y02D 70/00* (2018.01); *Y02D 70/10* (2018.01); *Y02D 70/12* (2018.01); *Y02D 70/122* (2018.01); *Y02D 70/126* (2018.01)

(58) Field of Classification Search
CPC . H04W 52/0225; H04W 76/27; H04W 72/12; Y02D 70/12; Y02D 70/122; Y02D 70/00; Y02D 70/10; Y02D 70/126
See application file for complete search history.

(56) References Cited

U.S. PATENT DOCUMENTS

| 2012/0044878 | A1 | 2/2012 | Ratasuk et al. |
| 2013/0265925 | A1 | 10/2013 | Tadaki |
| 2014/0235257 | A1 | 8/2014 | Hannu et al. |

(Continued)

FOREIGN PATENT DOCUMENTS

| CN | 102149080 A | 8/2011 |
| CN | 102158972 A | 8/2011 |

(Continued)

OTHER PUBLICATIONS

Samsung: "Views on solution for frequent small data transmission," 3GPP TSG RAN WG2 Meeting #83, R2-132737, Aug. 19-23, 2013, 4 pages, Barcelona, Spain.

(Continued)

*Primary Examiner* — Thai Nguyen
(74) *Attorney, Agent, or Firm* — Slater Matsil, LLP

(57) ABSTRACT

This application provides a transmission mode switching method and an apparatus. When UE is in a connected state, if an uplink service volume of the UE within a first detection time is less than a first threshold, the UE switches a state from the connected state to an ecology conservation optimization; or switches, in the connected state, a transmission mode from an uplink scheduling-based transmission mode to an uplink contention-based transmission mode.

19 Claims, 8 Drawing Sheets

(56) References Cited

U.S. PATENT DOCUMENTS

2014/0328183 A1    11/2014  Au et al.
2015/0223165 A1     8/2015  Xu
2015/0365856 A1*   12/2015  Krishnamoorthy ... H04W 76/27
                                                         370/331

FOREIGN PATENT DOCUMENTS

CN    103283282 A    9/2013
CN    103686952 A    3/2014
CN    103763748 A    4/2014
EP      2247146 A2  11/2010

OTHER PUBLICATIONS

Qualcomm Incorporated et al., "NR RRC states definition," 3GPP TSG-RAN WG2 Meeting #94, R2-164095, May 23-27, 2016, Nanjing, China, 4 pages.
Chen, Y. et al., "Small Data Optimized Radio Access Network Signaling/Control Design," 2014 IEEE International Conference on Communications Workshops (ICC), IEEE, Jun. 10, 2014, pp. 49-54.
Da Silva, I.L. et al., "A Novel State Model for 5G Radio Access Networks", 2016 IEEE International Conference on Communications Workshops (ICC), IEEE, May 23, 2016, pp. 632-637.
Ericsson, "Update to the Signaling reduction for UE state transitions solution," SA WG2 Meeting #110-AH, S2-152952, Aug. 31-Sep. 4, 2015, Sophia-Antipolis, France, 8 pages.

* cited by examiner

TRANSMISSION MODE SWITCHING METHOD AND APPARATUS

CROSS-REFERENCE TO RELATED APPLICATIONS

This application is a continuation of International Application No. PCT/CN2017/090625, filed on Jun. 28, 2017, which claims priority to Chinese Patent Application No. 201610489116.5, filed on Jun. 28, 2016. The disclosures of the aforementioned applications are hereby incorporated by reference in their entireties.

TECHNICAL FIELD

This application relates to communications technologies, and in particular, to a transmission mode switching method and an apparatus.

BACKGROUND

In a Long Term Evolution (LTE) system, states of user equipment (UE) includes an idle state and a connected state. The UE in the idle state cannot transmit uplink/downlink data. Currently, the connected state and the idle state are switched based on a keepalive timer. When the UE does not transmit data, the keepalive timer is enabled. If no new data is transmitted within a runtime of the keepalive timer, a network configures the UE to enter the idle state after the keepalive timer expires. When the UE is in the idle state, regardless of a data size, the UE needs to be switched from the idle state to the connected state as long as there is data to be transmitted, to perform data transmission, and switching from the idle state to the connected state generates relatively high signaling overheads. When the UE transmits only a small volume of data, the UE is switched from the idle state to the connected state, causing a waste of signaling resources and increasing energy consumption of the UE.

SUMMARY

This application provides a transmission mode switching method and an apparatus, to reduce energy consumption of UE, and reduce signaling overheads caused by state switching of the UE.

A first aspect of this application provides a transmission mode switching method. The method includes, when UE is in a connected state and an uplink service volume of the UE within a first detection time is less than a first threshold, switching, by the UE, a state from the connected state to an ecology conservation optimization, or switching, by the UE, a transmission mode from an uplink scheduling-based transmission mode to an uplink contention-based transmission mode.

Optionally, the method further includes: determining, by the UE, whether a current uplink service volume is less than a second threshold, where the second threshold is greater than or equal to the first threshold; when the current uplink service volume is less than the second threshold, enabling, by the UE, a first timer; and if an uplink service volume of the UE is always less than the first threshold within a runtime of the first timer, determining, by the UE, that the uplink service volume of the UE within the first detection time is less than the first threshold, where the runtime of the first timer is equal to the first detection time. If an uplink service volume of the UE at any time is greater than the first threshold within a runtime of the first timer, the UE resets the first timer.

In an implementation, the switching, by the UE, a state from the connected state to an ecology conservation optimization includes: sending, by the UE, a first switching request message to a network-side device, where the first switching request message is used to request the network-side device to switch the state of the UE from the connected state to the ecology conservation optimization; receiving, by the UE, a first switching response message sent by the network-side device based on the first switching request message; and switching, by the UE based on the first switching response message, the state from the connected state to the ecology conservation optimization.

In another implementation, the switching, by the UE, a transmission mode from an uplink scheduling-based transmission mode to an uplink contention-based transmission mode includes: sending, by the UE, a second switching request message to a network-side device, where the second switching request message is used to request the network-side device to switch the transmission mode of the UE from the uplink scheduling-based transmission mode to the uplink contention-based transmission mode; receiving, by the UE, a second switching response message sent by the network-side device based on the second switching request message; and switching, by the UE based on the second switching response message, the transmission mode from the uplink scheduling-based transmission mode to the uplink contention-based transmission mode.

In still another implementation, the switching the UE from the connected state to an ecology conservation optimization includes: sending, by the UE, a first switching notification message to a network-side device, where the first switching notification message is used to notify the network-side device that the UE determines to switch the state from the connected state to the ecology conservation optimization; and switching, by the UE, the state from the connected state to the ecology conservation optimization.

In yet another implementation, the switching, by the UE, a transmission mode from an uplink scheduling-based transmission mode to an uplink contention-based transmission mode includes: sending, by the UE, a second switching notification message to a network-side device, where the second switching notification message is used to notify the network-side device that the UE determines to switch the transmission mode from the uplink scheduling-based transmission mode to the uplink contention-based transmission mode; and switching, by the UE, the transmission mode from the uplink scheduling-based transmission mode to the uplink contention-based transmission mode.

Optionally, before the switching, by the UE, a state from the connected state to an ecology conservation optimization or the switching, by the UE, a transmission mode from an uplink scheduling-based transmission mode to an uplink contention-based transmission mode, the method further includes: determining, by the UE, whether a downlink service volume within the first detection time is less than a third threshold; and when the downlink service volume within the first detection time is less than the third threshold, switching, by the UE, the state from the connected state to the ecology conservation optimization, or switching, by the UE, the transmission mode from the uplink scheduling-based transmission mode to the uplink contention-based transmission mode.

A second aspect of this application provides a transmission mode switching method. The method includes receiving, by a network-side device, a first switching request message sent by UE. The method also includes determining, based on the first switching request message, to switch a state of the UE from the connected state to the ecology conservation optimization. The method also includes sending a first switching response message to the UE, where the first switching response message is used to instruct the UE to switch the state from the connected state to the ecology conservation optimization.

A third aspect of this application provides a transmission mode switching method. The method includes receiving, by a network-side device, a second switching request message sent by UE. The method also includes determining, based on the second switching request message, to switch a transmission mode of the UE from the uplink scheduling-based transmission mode to the uplink contention-based transmission mode. The method also includes sending a second switching response message to the UE, where the second switching response message is used to instruct the UE to switch the transmission mode from the uplink scheduling-based transmission mode to the uplink contention-based transmission mode.

A fourth aspect of this application provides a transmission mode switching method, including: when UE is in an ecology conservation optimization and an uplink service volume of the UE within a second detection time is greater than a fourth threshold, sending, by the UE, a third switching request message to a network-side device, where the third switching request message is used to request the network-side device to switch a state of the UE from the ecology conservation optimization to a connected state; receiving, by the UE, a third switching response message sent by the network-side device based on the third switching request message; and switching, by the UE based on the third switching response message, the state from the ecology conservation optimization to the connected state.

A fifth aspect of this application provides a transmission mode switching method. The method includes, when a transmission mode of UE is an uplink contention-based transmission mode and an uplink service volume of the UE within a second detection time is greater than a fourth threshold, sending, by the UE, a fourth switching request message to a network-side device, where the fourth switching request message is used to request the network-side device to switch the transmission mode of the UE from the uplink contention-based transmission mode to an uplink scheduling-based transmission mode. The method also includes receiving, by the UE, a fourth switching response message sent by the network-side device based on the fourth switching request message. The method also includes switching, by the UE, the transmission mode from the uplink contention-based transmission mode to the uplink scheduling-based transmission mode based on the fourth switching response message.

Optionally, based on the fourth aspect and the fifth aspect, the method further includes: detecting, by the UE, whether a current uplink service volume is greater than a fifth threshold, where the fifth threshold is less than or equal to the fourth threshold; when the current uplink service volume of the UE is greater than the fifth threshold, enabling, by the UE, a second timer; and if an uplink service volume of the UE is greater than the fourth threshold within a runtime of the second timer, determining, by the UE, that the uplink service volume of the UE within the second detection time is greater than the fourth threshold, where the runtime of the second timer is equal to the second detection time.

A sixth aspect of this application provides a transmission mode switching method. The method includes receiving, by a network-side device, a third switching request message sent by UE, where the third switching request message is used to request the network-side device to switch a state of the UE from the ecology conservation optimization to the connected state. The method also includes determining, by the network-side device based on the third switching request, to switch the state of the UE from the ecology conservation optimization to the connected state. The method also includes sending, by the network-side device, a third switching response message to the UE, where the third switching response message is used to instruct the UE to switch the state from the ecology conservation optimization to the connected state.

A seventh aspect of this application provides a transmission mode switching method. The method includes receiving, by a network-side device, a fourth switching request message sent by UE, where the fourth switching request message is used to request the network-side device to switch a transmission mode of the UE from the uplink contention-based transmission mode to the uplink scheduling-based transmission mode. The method also includes determining, by the network-side device based on the fourth switching request message, to switch the transmission mode of the UE from the uplink contention-based transmission mode to the uplink scheduling-based transmission mode. The method also includes sending, by the network-side device, a fourth switching response message to the UE, where the fourth switching response message is used to instruct the UE to switch the transmission mode from the uplink contention-based transmission mode to the uplink scheduling-based transmission mode.

An eighth aspect of this application provides UE. The UE includes a switching module. The switching module is configured to: switch, when the UE is in a connected state and an uplink service volume of the UE within a first detection time is less than a first threshold, a state of the UE from the connected state to an ecology conservation optimization, or switch a transmission mode of the UE from an uplink scheduling-based transmission mode to an uplink contention-based transmission mode.

Optionally, the UE further includes a first determining module. The first determining module is configured to: determine whether a current uplink service volume of the UE is less than a second threshold, where the second threshold is greater than or equal to the first threshold; when the current uplink service volume of the UE is less than the second threshold, enable a first timer; and if an uplink service volume of the UE is always less than the first threshold within a runtime of the first timer, determine that the uplink service volume of the UE within the first detection time is less than the first threshold, where the runtime of the first timer is equal to the first detection time.

Optionally, the UE further includes a sending module and a receiving module. The sending module is configured to send a first switching request message to a network-side device, where the first switching request message is used to request the network-side device to switch the state of the UE from the connected state to the ecology conservation optimization. The receiving module is configured to receive a first switching response message sent by the network-side device based on the first switching request message. Correspondingly, the switching module is specifically configured to switch the state of the UE from the connected state to the ecology conservation optimization based on the first switching response message.

Alternatively, the sending module is configured to send a second switching request message to a network-side device, where the second switching request message is used to request the network-side device to switch the transmission mode of the UE from the uplink scheduling-based transmission mode to the uplink contention-based transmission mode. The receiving module is configured to receive a second switching response message sent by the network-side device based on the second switching request message. Correspondingly, the switching module is specifically configured to switch the transmission mode of the UE from the uplink scheduling-based transmission mode to the uplink contention-based transmission mode based on the second switching response message.

Alternatively, the sending module is configured to send a first switching notification message to a network-side device, where the first switching notification message is used to notify the network-side device that the UE determines to switch the state from the connected state to the ecology conservation optimization; and then the switching module switches the state of the UE from the connected state to the ecology conservation optimization.

Alternatively, the sending module is configured to send a second switching notification message to a network-side device, where the second switching notification message is used to notify the network-side device that the UE determines to switch the transmission mode from the uplink scheduling-based transmission mode to the uplink contention-based transmission mode; and then the switching module switches the transmission mode of the UE from the uplink scheduling-based transmission mode to the uplink contention-based transmission mode.

Optionally, the UE further includes a second determining module. The second determining module is configured to determine whether a downlink service volume of the UE within the first detection time is less than a third threshold. Correspondingly, the switching module is specifically configured to: when the downlink service volume of the UE within the first detection time is less than the third threshold, switch the state of the UE from the connected state to the ecology conservation optimization, or switch the transmission mode of the UE from the uplink scheduling-based transmission mode to the uplink contention-based transmission mode.

A ninth aspect of this application provides a network-side device, including a receiving module, a determining module, and a sending module. The receiving module is configured to receive a first switching request message sent by UE, where the first switching request message is used to request the network-side device to switch a state of the UE from the connected state to the ecology conservation optimization. The determining module is configured to determine, based on the first switching request message, to switch the state of the UE from the connected state to the ecology conservation optimization. The sending module is configured to send a first switching response message to the UE, where the first switching response message is used to instruct the UE to switch the state from the connected state to the ecology conservation optimization.

A tenth aspect of this application provides a network-side device, including a receiving module, a determining module, and a sending module. The receiving module is configured to receive a second switching request message sent by UE, where the second switching request message is used to request the network-side device to switch a transmission mode of the UE from the uplink scheduling-based transmission mode to the uplink contention-based transmission mode. The determining module is configured to determine, based on the second switching request message, to switch the transmission mode of the UE from the uplink scheduling-based transmission mode to the uplink contention-based transmission mode. The sending module is configured to send a second switching response message to the UE, where the second switching response message is used to instruct the UE to switch the transmission mode from the uplink scheduling-based transmission mode to the uplink contention-based transmission mode.

An eleventh aspect of this application provides a UE. The UE includes a sending module, configured to: when the UE is in an ecology conservation optimization and an uplink service volume of the UE within a second detection time is greater than a fourth threshold, send a third switching request message to a network-side device, where the third switching request message is used to request the network-side device to switch a state of the UE from the ecology conservation optimization to a connected state. The UE also includes a receiving module, configured to receive a third switching response message sent by the network-side device based on the third switching request message. The UE also includes a switching module, configured to switch the state of the UE from the ecology conservation optimization to the connected state based on the third switching response message.

A twelfth aspect of this application provides a UE. The UE includes a sending module, configured to: when a transmission mode of the UE is an uplink contention-based transmission mode and an uplink service volume of the UE within a second detection time is greater than a fourth threshold, send a fourth switching request message to a network-side device, where the fourth switching request message is used to request the network-side device to switch the transmission mode of the UE from the uplink contention-based transmission mode to an uplink scheduling-based transmission mode. The UE also includes a receiving module, configured to receive a fourth switching response message sent by the network-side device based on the fourth switching request message. The UE also includes a switching module, configured to switch the transmission mode of the UE from the uplink contention-based transmission mode to the uplink scheduling-based transmission mode based on the fourth switching response message.

Based on the UE provided in the eleventh aspect and the twelfth aspect, optionally, the UE further includes a determine module. The determine module is configured to: detect whether a current uplink service volume is greater than a fifth threshold, where the fifth threshold is less than or equal to the fourth threshold; when the current uplink service volume of the UE is greater than the fifth threshold, enable a second timer; and if an uplink service volume of the UE within a runtime of the second timer is greater than the fourth threshold, determine that the uplink service volume of the UE within the second detection time is greater than the fourth threshold, where the runtime of the second timer is equal to the second detection time.

A thirteenth aspect of this application provides a network-side device. The network-side device includes a receiving module, configured to receive a third switching request message sent by UE, where the third switching request message is used to request the network-side device to switch a state of the UE from the ecology conservation optimization to the connected state. The network-side device also includes a determining module, configured to determine, based on the third switching request, to switch the state of the UE from the ecology conservation optimization to the connected state. The network-side device also includes a sending module, configured to send a third switching response message to the UE, where the third switching response message is used to instruct the UE to switch the state from the ecology conservation optimization to the connected state.

A fourteenth aspect of this application provides a network-side device. The network-side device includes a receiving module, configured to receive a fourth switching request message sent by UE, where the fourth switching request message is used to request the network-side device to switch a transmission mode of the UE from the uplink contention-based transmission mode to the uplink scheduling-based transmission mode. The network-side device includes a determining module, configured to determine, based on the fourth switching request message, to switch the transmission mode of the UE from the uplink contention-based transmission mode to the uplink scheduling-based transmission mode. The network-side device also includes a sending module, configured to send a fourth switching response message to the UE, where the fourth switching response message is used to instruct the UE to switch the transmission mode from the uplink contention-based transmission mode to the uplink scheduling-based transmission mode.

A fifteenth aspect of this application provides a UE, including a processor and a memory. The memory is configured to store a program, and the processor invokes the program stored in the memory, to enable the UE to perform a method. The method includes, when the UE is in a connected state and an uplink service volume of the UE within a first detection time is less than a first threshold, switching a state of the UE from the connected state to an ecology conservation optimization, or switching a transmission mode of the UE from an uplink scheduling-based transmission mode to an uplink contention-based transmission mode.

Optionally, the processor is further configured to: determine whether a current uplink service volume is less than a second threshold, where the second threshold is greater than or equal to the first threshold; when the current uplink service volume is less than the second threshold, enable a first timer; and if an uplink service volume of the UE is always less than the first threshold within a runtime of the first timer, determine that the uplink service volume of the UE within the first detection time is less than the first threshold, where the runtime of the first timer is equal to the first detection time. If an uplink service volume of the UE at any time is greater than the first threshold within a runtime of the first timer, the UE resets the first timer.

Optionally, the UE further includes a transmitter and a receiver.

In an implementation, the transmitter is configured to send a first switching request message to a network-side device, where the first switching request message is used to request the network-side device to switch the state of the UE from the connected state to the ecology conservation optimization. The receiver is configured to receive a first switching response message sent by the network-side device based on the first switching request message. Correspondingly, the processor is specifically configured to switch the state from the connected state to the ecology conservation optimization based on the first switching response message.

In another implementation, the transmitter is configured to send a second switching request message to a network-side device, where the second switching request message is used to request the network-side device to switch the transmission mode of the UE from the uplink scheduling-based transmission mode to the uplink contention-based transmission mode. The receiver is configured to receive a second switching response message sent by the network-side device based on the second switching request message. Correspondingly, the processor is specifically configured to switch the transmission mode from the uplink scheduling-based transmission mode to the uplink contention-based transmission mode based on the second switching response message.

In still another implementation, the transmitter is configured to send a first switching notification message to a network-side device, where the first switching notification message is used to notify the network-side device that the UE determines to switch the state from the connected state to the ecology conservation optimization; and then the processor switches the state of the UE from the connected state to the ecology conservation optimization.

In yet another implementation, the transmitter is configured to send a second switching notification message to a network-side device, where the second switching notification message is used to notify the network-side device that the UE determines to switch the transmission mode from the uplink scheduling-based transmission mode to the uplink contention-based transmission mode; and then the processor switches the transmission mode of the UE from the uplink scheduling-based transmission mode to the uplink contention-based transmission mode.

Optionally, the processor is further configured to: before the state of the UE is switched from the connected state to the ecology conservation optimization, or the transmission mode of the UE is switched from the uplink scheduling-based transmission mode to the uplink contention-based transmission mode, determine whether a downlink service volume within the first detection time is less than a third threshold; and when the downlink service volume within the first detection time is less than the third threshold, switch the state of the UE from the connected state to the ecology conservation optimization, or switch the transmission mode of the UE from the uplink scheduling-based transmission mode to the uplink contention-based transmission mode.

A sixteenth aspect of this application provides a network-side device, including a processor, a memory, a receiver, and a transmitter. The memory, the receiver, and the transmitter are connected to and communicate with the processor by using a bus. The memory is configured to store a program. The processor invokes the program stored in the memory. The network-side device is configured as follows.

The receiver is configured to receive a first switching request message sent by UE, where the first switching request message is used to request the network-side device to switch a state of the UE from the connected state to the ecology conservation optimization.

The processor is configured to determine, based on the first switching request message, to switch the state of the UE from the connected state to the ecology conservation optimization.

The transmitter is configured to send a first switching response message to the UE, where the first switching response message is used to instruct the UE to switch the state from the connected state to the ecology conservation optimization.

A seventeenth aspect of this application provides a network-side device, including a processor, a memory, a receiver, and a transmitter. The memory, the receiver, and the transmitter are connected to and communicate with the processor by using a bus. The memory is configured to store a program. The processor invokes the program stored in the memory. The network-side device is configured as follows.

The receiver is configured to receive a second switching request message sent by UE, where the second switching request message is used to request the network-side device to switch a transmission mode of the UE from an uplink scheduling-based transmission mode to an uplink contention-based transmission mode.

The processor is configured to determine, based on the second switching request message, to switch the transmission mode of the UE from the uplink scheduling-based transmission mode to the uplink contention-based transmission mode.

The transmitter is configured to send a second switching response message to the UE, where the second switching response message is used to instruct the UE to switch the transmission mode from the uplink scheduling-based transmission mode to the uplink contention-based transmission mode.

An eighteenth aspect of this application provides a UE, including a processor, a memory, a receiver, and a transmitter. The memory, the receiver, and the transmitter are connected to and communicate with the processor by using a bus. The memory is configured to store a program. The processor invokes the program stored in the memory. The UE is configured as follows.

The transmitter is configured to: when the UE is in an ecology conservation optimization and an uplink service volume of the UE within a second detection time is greater than a fourth threshold, send a third switching request message to a network-side device, where the third switching request message is used to request the network-side device to switch a state of the UE from the ecology conservation optimization to a connected state.

The receiver is configured to receive a third switching response message sent by the network-side device based on the third switching request message.

The processor is configured to switch the state from the ecology conservation optimization to the connected state based on the third switching response message.

A nineteenth aspect of this application provides a UE, including a processor, a memory, a receiver, and a transmitter. The memory, the receiver, and the transmitter are connected to and communicate with the processor by using a bus. The memory is configured to store a program. The processor invokes the program stored in the memory. The UE is configured as follows.

The transmitter is configured to: when a transmission mode of the UE is an uplink contention-based transmission mode and an uplink service volume of the UE within a second detection time is greater than a fourth threshold, send a fourth switching request message to a network-side device, where the fourth switching request message is used to request the network-side device to switch the transmission mode of the UE from the uplink contention-based transmission mode to an uplink scheduling-based transmission mode.

The receiver is configured to receive a fourth switching response message sent by the network-side device based on the fourth switching request message.

The processor is configured to switch the transmission mode from the uplink contention-based transmission mode to the uplink scheduling-based transmission mode based on the fourth switching response message.

Optionally, based on the eighteenth aspect and the nineteenth aspect, the processor is further configured to: detect whether a current uplink service volume of the UE is greater than a fifth threshold, where the fifth threshold is less than or equal to the fourth threshold; when the current uplink service volume of the UE is greater than the fifth threshold, enable a second timer; and if an uplink service volume of the UE is greater than the fourth threshold within a runtime of the second timer, determine that the uplink service volume of the UE within the second detection time is greater than the fourth threshold, where the runtime of the second timer is equal to the second detection time.

A twentieth aspect of this application provides a network-side device, including a processor, a memory, a receiver, and a transmitter. The memory, the receiver, and the transmitter are connected to and communicate with the processor by using a bus. The memory is configured to store a program. The processor invokes the program stored in the memory. The network-side device is configured as follows.

The receiver is configured to receive a third switching request message sent by UE, where the third switching request message is used to request the network-side device to switch a state of the UE from the ecology conservation optimization to the connected state.

The processor is configured to determine, based on the third switching request, to switch the state of the UE from the ecology conservation optimization to the connected state.

The transmitter is configured to send a third switching response message to the UE, where the third switching response message is used to instruct the UE to switch the state from the ecology conservation optimization to the connected state.

A twenty-first aspect of this application provides a network-side device, including a processor, a memory, a receiver, and a transmitter. The memory, the receiver, and the transmitter are connected to and communicate with the processor by using a bus. The memory is configured to store a program. The processor invokes the program stored in the memory. The network-side device is configured as follows.

The receiver is configured to receive a fourth switching request message sent by UE, where the fourth switching request message is used to request the network-side device to switch a transmission mode of the UE from the uplink contention-based transmission mode to the uplink scheduling-based transmission mode.

The processor is configured to determine, based on the fourth switching request message, to switch the transmission mode of the UE from the uplink contention-based transmission mode to the uplink scheduling-based transmission mode.

The transmitter is configured to send a fourth switching response message to the UE, where the fourth switching response message is used to instruct the UE to switch the transmission mode from the uplink contention-based transmission mode to the uplink scheduling-based transmission mode.

Based on the first aspect to the twenty-first aspect of this application, the following may optionally be included.

Optionally, the first switching request message includes first switching indication information and/or information about the uplink service volume of the UE within the first detection time, and the first switching indication information is used to indicate that the first switching request message is used to request the network-side device to switch the state of the UE from the connected state to the ecology conservation optimization.

Optionally, the second switching request message includes second switching indication information and/or information about the uplink service volume of the UE within the first detection time, and the second switching indication information is used to indicate that the second switching request message is used to request the network-side device to switch the transmission mode of the UE from the uplink scheduling-based transmission mode to the uplink contention-based transmission mode.

Optionally, the third switching request message includes third switching indication information and/or information about the uplink service volume of the UE within the second detection time, and the third switching indication information is used to indicate that the third switching request message is used to request the network-side device to switch the state of the UE from the ecology conservation optimization to the connected state.

Optionally, the fourth switching request message includes fourth switching indication information and/or information about the uplink service volume of the UE within the second detection time, and the fourth switching indication information is used to indicate that the fourth switching request message is used to request to switch the transmission mode of the UE from the uplink contention-based transmission mode to the uplink scheduling-based transmission mode.

The uplink service volume of the UE within the first detection time includes any one of the following service volumes: a size of data that needs to be transmitted in an uplink buffer of the UE within the first detection time, a size of data that needs to be transmitted in an uplink buffer of the UE within each scheduling period within the first detection time, a size of an uplink data packet sent by the UE each time within the first detection time, a service volume of any application within the first detection time, a service volume of any type of service within the first detection time, a volume of data transmitted on any logical channel within the first detection time, and a volume of data transmitted in any logical channel group within the first detection time.

The uplink service volume of the UE within the second detection time includes any one of the following service volumes: a size of data that needs to be transmitted in an uplink buffer of the UE within the second detection time, a size of data that needs to be transmitted in an uplink buffer of the UE within each scheduling period within the second detection time, a size of an uplink data packet sent by the UE each time within the second detection time, a service volume of any application within the second detection time, a service volume of any type of service within the second detection time, a volume of data transmitted on any logical channel within the second detection time, and a volume of data transmitted in any logical channel group within the second detection time.

A twenty-second aspect of this application provides a computer-readable medium. The computer-readable medium includes a computer-executable instruction. The computer-executable instruction is used to enable UE to perform the method according to any one of the first aspect, the fourth aspect, and the fifth aspect of this application.

A twenty-third aspect of this application provides a computer-readable medium. The computer-readable medium includes a computer-executable instruction. The computer-executable instruction is used to enable a network-side device to perform the method according to any one of the second aspect, the third aspect, the sixth aspect, and the seventh aspect of this application.

A twenty-fourth aspect of this application provides an on-chip system. The system is applicable to UE. The on-chip system includes at least one communications interface, at least one processor, and at least one memory. The communications interface, the memory, and the processor are connected to each other by using a bus. The processor invokes an instruction stored in the memory, to perform operations of the UE in the method according to any one of the first aspect, the fourth aspect, and the fifth aspect of this application.

A twenty-fifth aspect of this application provides an on-chip system. The system is applicable to a network-side device. The on-chip system includes at least one communications interface, at least one processor, and at least one memory. The communications interface, the memory, and the processor are connected to each other by using a bus. The processor invokes an instruction stored in the memory, to perform operations of the network-side device in the method according to any one of the second aspect, the third aspect, the sixth aspect, and the seventh aspect of this application.

A twenty-sixth aspect of this application provides a communications system. The communications system includes a UE and a network-side device. The UE is configured to perform the method according to any one of the first aspect, the fourth aspect, and the fifth aspect of this application. The network-side device is configured to perform the method according to any one of the second aspect, the third aspect, the sixth aspect, and the seventh aspect of this application.

According to the transmission mode switching method and the apparatus provided in this application, when the UE is in the connected state, if the uplink service volume of the UE within the first detection time is less than the first threshold, the UE switches the state from the connected state to the ecology conservation optimization, or switches, in the connected state, the transmission mode from the uplink scheduling-based transmission mode to the uplink contention-based transmission mode, so that the transmission mode of the UE can be adapted to a change of a service volume of the UE, to effectively use a transmission resource, and energy consumption of the UE can be reduced because the UE does not need to detect a dynamic control channel.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
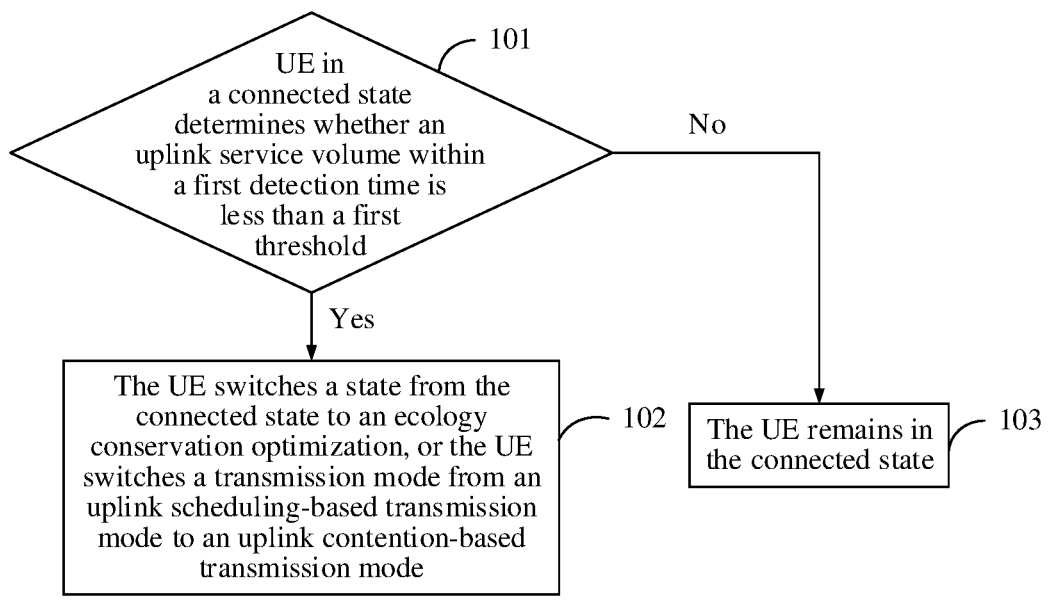
FIG. 1 is a flowchart of a transmission mode switching method according to Embodiment 1 of this application.

A method in this application may be applied to a Global System for Mobile Communications (GSM) system, a Code Division Multiple Access (CDMA) system, a Wideband Code Division Multiple Access (WCDMA) system, a Long Term Evolution (LTE) system, or a future 5G system. This is not limited herein.

User equipment in this application may be a wireless terminal. The wireless terminal may be a device that provides a user with voice and/or data connectivity, a handheld device with a wireless connection function, or another processing device connected to a wireless modem. The wireless terminal may communicate with at least one core network through a radio access network (RAN). The wireless terminal may be a mobile terminal, for example, a mobile phone (or referred to as a "cellular" phone), and a computer that has a mobile terminal. For example, the wireless terminal may be a portable, pocket-size, handheld, computer-integrated or in-vehicle mobile apparatus, which exchanges voice and/or data with the radio access network. The wireless terminal may also be referred to as a subscriber unit, a subscriber station, a mobile station, a mobile console (Mobile Station), a remote station, an access point, a remote terminal, an access terminal, a user terminal, a user agent, or user equipment. This is not limited herein.

A base station in embodiments of this application may be a base transceiver station (BTS) in the Global System for Mobile Communications GSM or CDMA, a NodeB (NB) in WCDMA, an evolved NodeB (eNB), an access point (AP) or a relay station in the LTE system, a base station in the 5G system, or the like. This is not limited herein.

Various objects that may appear in this application such as various messages/information/devices/network elements/systems/apparatuses/actions/operations/procedures/concepts are named. However, these specific names do not constitute a limitation to relevant objects. The names may be changed with factors such as scenarios, context, or use habits. Understanding of technical meanings of the relevant objects should be mainly determined in terms of functions and technical effects embodied/performed by the relevant objects in technical solutions.

RRC states of the UE in this application include a connected state and an idle state, or include a connected state, an ecology conservation optimization (ECO), and an idle state. The ecology conservation optimization is also referred to as a third state or a connected-inactive state. This is not limited herein. As a network architecture evolves and a new application scenario emerges, RRC connected states of the UE may also include only the connected state and the ecology conservation optimization. That is, the idle state is replaced with the connected state. The UE in the idle state cannot transmit data; the UE in the connected state performs data transmission normally; the UE in the ecology conservation optimization can transmit a small volume of data.

In this application, the UE in the connected state has some or all of the following functions: (1) processing interactive and conversational services, an ultra-short latency service, and services such as video and voice services; (2) supporting the UE in uplink scheduling-based and/or downlink scheduling-based transmission, that is, the UE may use an uplink-downlink shared resource and/or private resource; and (3) supporting fast connection management such as fast link adaptation and short-period measurement. The UE has some or all of the following functions in the ecology conservation optimization: (1) processing some background services and small-sized transmission; (2) supporting downlink scheduling-based (DL Scheduling-based) transmission, that is, being capable of using a downlink shared resource; (3) supporting uplink contention-based transmission, that is, being capable of using an uplink shared resource; (4) skipping monitoring a dynamic control channel for a long term; (5) perform a little long-term management such as long-period link adaptation and long-period measurement; and (6) reserving an RRC connection to a network side. In the ecology conservation optimization, the UE does not monitor the dynamic control channel and performs only a little long-term management. Therefore, energy consumption of the UE can be reduced. A difference between an uplink scheduling-based transmission mode and an uplink contention-based transmission mode lies in that used transmission resources are different. A transmission resource used in the uplink scheduling-based transmission mode is a private resource. When the UE transmits uplink data, a network-side device (for example, a base station, a controller, or another control unit) needs to allocate an uplink transmission resource. A transmission resource used in the uplink contention-based transmission mode is an uplink shared resource. A plurality of UEs in a cell can all use the uplink shared resource, and the uplink shared resource does not need to be allocated by the network side. When there is data to be transmitted, the UE can use the shared resource provided that the shared resource is idle.

FIG. 1 is a flowchart of a transmission mode switching method according to Embodiment 1 of this application. As shown in FIG. 1, the method provided in this embodiment may include the following steps.

Step 101: WUE in a connected state determines whether an uplink service volume within a first detection time is less than a first threshold.

If the uplink service volume of the UE within the first detection time is less than the first threshold, the UE performs step 102. If the uplink service volume of the UE within the first detection time is greater than or equal to the first threshold, the UE performs step 103.

Step 102: The UE switches a state from the connected state to an ecology conservation optimization, or the UE switches a transmission mode from an uplink scheduling-based transmission mode to an uplink contention-based transmission mode.

Step 103: The UE remains in the connected state.

The first detection time may be a time value pre-configured by an operator or a device vendor for the UE and a network-side device. When the UE and the network-side device are at delivery, the first detection time is already stored in memories of the UE and the network-side device by the operator or the device vendor. Alternatively, the first detection time is a time value configured by a network-side device for the UE. Specifically, the network-side device may configure the first detection time for the UE by using a broadcast message. Alternatively, the network-side device configures the first detection time for the UE by using dedicated RRC signaling. In step 102, the UE in the connected state detects the uplink service volume of the UE within the first detection time based on configuration of the network-side device. Alternatively, the UE periodically or continuously detects whether a current uplink service volume is less than a second threshold. The second threshold is greater than or equal to the first threshold, and the first threshold and the second threshold are both greater than 0. When detecting that the current uplink service volume is less than the second threshold, the UE enables a first timer. If an uplink service volume of the UE is always less than the first threshold within a runtime of the first timer, after timing of the first timer expires, the UE determines that the uplink service volume within the first detection time is less than the first threshold, where the runtime of the first timer is equal to the first detection time. If, an uplink service volume of the UE at any time is greater than the first threshold within a runtime of the first timer, the UE resets the first timer.

In this embodiment, the uplink service volume of the UE within the first detection time includes at least any one of the following service volumes: a size of data that needs to be transmitted in an uplink buffer of the UE within the first detection time, a size of data that needs to be transmitted in an uplink buffer of the UE within each scheduling period within the first detection time, a size of an uplink data packet sent by the UE each time within the first detection time, a service volume of any application within the first detection time, a service volume of any type of service within the first detection time, a volume of data transmitted on any logical channel within the first detection time, and a volume of data transmitted in any logical channel group within the first detection time.

When the first detection time includes only one scheduling period, the UE determines that the uplink service volume within the first detection time is less than the first threshold, provided that a size of data that needs to be transmitted in the uplink buffer of the UE within the scheduling period is less than the first threshold. When the first detection time includes a plurality of scheduling periods, the UE needs to determine that a size of data that needs to be transmitted in the uplink buffer within each of the plurality of scheduling periods is less than the first threshold, to determine that the uplink service volume of the UE within the first detection time is less than the first threshold. Similarly, when uplink data packets may be sent a plurality of times within the first detection time, the UE needs to determine a size of an uplink data packet sent each time is less than the first threshold, to determine that the uplink service volume of the UE within the first detection time is less than the first threshold.

For different uplink service volumes, the first threshold may be set to a universal threshold, or may be set to different thresholds for the different uplink service volumes. For example, services may include a latency-sensitive service, a latency-insensitive service, a service requiring high reliability, a best effort service, a service having a high QoS requirement, a service having a low QoS requirement, and the like in terms of a service type. Different first thresholds or a same first threshold may be set for different service types. Alternatively, a same first threshold or different first thresholds is/are set for different applications (for example, WeChat, a microblog, and QQ) or different application types (for example, instant messaging software, a browser, and shopping software). Alternatively, a same first threshold or different first thresholds is/are set for different logical channels or logical channel groups.

Optionally, the uplink service volume of the UE within the first detection time may alternatively be a plurality of the foregoing service volumes. For example, the uplink service volume of the UE within the first detection time is a service volume of an application and a service volume of a type of service. Within the first detection time, the service volume of the application needs to be less than the first threshold, service volumes of some or all types of services running on the application all need to be less than the first threshold, and one or more different types of services may run on the application, so that the UE determines that the uplink service volume within the first detection time is less than the first threshold. A value of the first threshold that is set for the service volume of the application is different from that of the first threshold that is set for the service volume of the type of service. Alternatively, the uplink service volume of the UE within the first detection time is the volume of the data transmitted by the UE on any logical channel within the first detection time and the volume of the data transmitted by the UE in any logical channel group within the first detection time. Within the first detection time, a volume of a service transmitted by the UE on a logical channel is less than the first threshold, and a volume of a service transmitted by the UE in a logical channel group to which the logical channel belongs needs to be less than the first threshold, so that the UE determines that the uplink service volume within the first detection time is less than the first threshold. In this case, a value of the first threshold that is set for the logical channel is different from that of the first threshold that is set for the logical channel group to which the logical channel belongs.

In this embodiment, that the uplink service volume of the UE within the first detection time is less than the first threshold indicates that a volume of uplink data that the UE needs to transmit is small. In this case, the UE is in the connected state and uses the uplink scheduling-based transmission mode. Therefore, even if the volume of the data transmitted by the UE is small, the UE still needs to detect a dynamic control channel, resulting in increase of energy consumption of the UE. In addition, a private resource is used for uplink scheduling. In this case, the volume of the uplink data is small, and the private resource is idle most of time, resulting in a waste of the private resource.

When the uplink service volume of the UE within the first detection time is less than the first threshold, the UE switches the state from the connected state to the ecology conservation optimization, or the UE switches the transmission mode from the uplink scheduling-based transmission mode to the uplink contention-based transmission mode. If the UE includes only the connected state and an idle state, the UE can only continue to remain in the connected state, and only switches the transmission mode from the uplink scheduling-based transmission mode to the uplink contention-based transmission mode. If the UE includes the connected state and the ecology conservation optimization, the UE or a base station may determine whether to enter the ecology conservation optimization or continue to remain in the connected state and only switch the transmission mode to the uplink contention-based transmission mode. In the ecology conservation optimization, the transmission mode used by the UE may be the uplink contention-based transmission mode. Switching of the state of the UE is actually also switching of the transmission mode. In the ecology conservation optimization or the uplink contention-based transmission mode, the UE does not need to detect the dynamic control channel for a long term, so that the energy consumption of the UE can be reduced. In addition, in the ecology conservation optimization or the uplink contention-based transmission mode, the UE uses a shared resource to transmit the uplink data, avoiding the waste of the private resource.

In this embodiment, when the UE is in the connected state and the uplink service volume of the UE within the first detection time is less than the first threshold, the UE switches the state from the connected state to the ecology conservation optimization, or the UE switches the transmission mode from the uplink scheduling-based transmission mode to the uplink contention-based transmission mode. The UE switches the state from the connected state to the ecology conservation optimization, or switches the transmission mode from the uplink scheduling-based transmission mode to the uplink contention-based transmission mode in the connected state, so that the transmission mode of the UE can be adapted to a change of a service volume of the UE, to effectively use a transmission resource, and the energy consumption of the UE can be reduced because the UE does not need to detect the dynamic control channel for the long term.

The technical solution in the method embodiment shown in FIG. 1 is described in detail below by using a plurality of specific embodiments.

Figure 2:
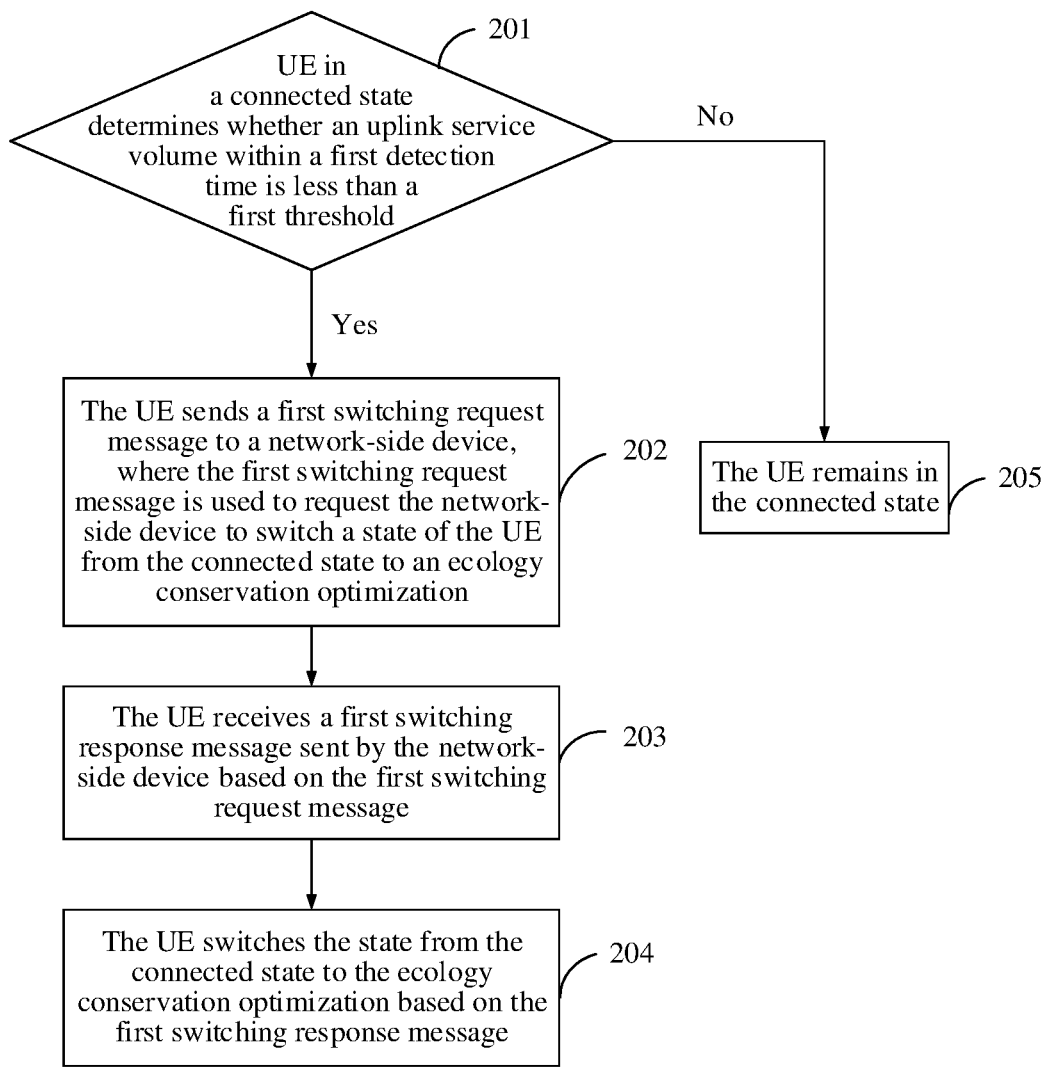
FIG. 2 is a flowchart of a transmission mode switching method according to Embodiment 2 of this application.

FIG. 2 is a flowchart of a transmission mode switching method according to Embodiment 2 of this application. In this embodiment, a network-side device determines state switching of UE. As shown in FIG. 2, the method in this embodiment may include the following steps.

Step 201: the UE in a connected state determines whether an uplink service volume within a first detection time is less than a first threshold.

If the uplink service volume of the UE within the first detection time is less than the first threshold, the UE performs step 202. If the uplink service volume of the UE within the first detection time is greater than or equal to the first threshold, the UE performs step 205.

Step 202: The UE sends a first switching request message to the network-side device, where the first switching request message is used to request the network-side device to switch a state of the UE from the connected state to an ecology conservation optimization.

Step 203: The UE receives a first switching response message sent by the network-side device based on the first switching request message.

Step 204: The UE switches the state from the connected state to the ecology conservation optimization based on the first switching response message.

Step 205: The UE remains in the connected state.

In step 201, the UE determines whether the uplink service volume within the first detection time is less than the first threshold. For a specific determining manner, refer to related descriptions of step 101 in Embodiment 1. Details are not described herein again. In this embodiment, when the uplink service volume of the UE within the first detection time is less than the first threshold, the UE sends the first switching request message to the network-side device. The first switching request message is used to request the network-side device to switch the state of the UE from the connected state to the ecology conservation optimization. The network-side device may be a base station, a network controller, or other control units. The uplink service volume of the UE within the first detection time includes at least any one of the following service volumes: a size of data that needs to be transmitted in an uplink buffer of the UE within the first detection time, a size of data that needs to be transmitted in an uplink buffer of the UE within each scheduling period within the first detection time, a size of an uplink data packet sent by the UE each time within the first detection time, a service volume of any application within the first detection time, a service volume of any type of service within the first detection time, a volume of data transmitted on any logical channel within the first detection time, and a volume of data transmitted in any logical channel group within the first detection time. Optionally, the uplink service volume of the UE within the first detection time may alternatively be a plurality of the foregoing service volumes.

In step 202, the first switching request message may be in a newly defined message format, or may be in an existing message format. Optionally, the first switching request message includes first switching indication information, and the first switching indication information is used to indicate that the first switching request message is used to request the network-side device to switch the state of the UE from the connected state to the ecology conservation optimization. The first switching indication information may be denoted as an indicator value of one bit. For example, one or zero is used to indicate that the first switching request message is used to request to switch the state of the UE from the connected state to the ecology conservation optimization.

After receiving the first switching request message, the network-side device learns, according to the first switching indication, that the first switching request message is used to request to switch the state of the UE from the connected state to the ecology conservation optimization. Then, the network-side device determines whether to switch the state of the UE. If determining to switch the state of the UE, the network-side device sends the first switching response message to the UE. If determining not to switch the state of the UE, the network-side device sends a first switching rejection message to the UE, or the network-side device makes no response. Optionally, the first switching response message may carry first indication information. The first indication information may be used to instruct the UE to switch to the ecology conservation optimization.

Optionally, the first switching request message includes information about the uplink service volume of the UE within the first detection time. The information about the uplink service volume is used to implicitly request to switch the state of the UE from the connected state to the ecology conservation optimization. The information about the uplink service volume may be specifically a value of the uplink service volume of the UE within the first detection time or a level of the uplink service volume. The level of the uplink service volume is transmitted rather than the value of the uplink service volume, so that a length of control information can be reduced.

Optionally, the information about the uplink service volume may further include at least one of the following information: a service type, an application identifier, an application type, a logical channel identifier, and a logical channel group identifier. The service type may include a latency-sensitive service, a latency-insensitive service, a service requiring high reliability, a best effort service, a service having a high QoS requirement, a service having a low QoS requirement, and the like. The application identifier may be used to identify a specific application, for example, WeChat, a microblog, and QQ). Different application types may be used to identify types of applications, for example, instant messaging software, a browser, and shopping software.

After receiving the first switching request message, the network-side device determines, based on the information about the uplink service volume of the UE within the first detection time, whether to switch the state of the UE. If determining to switch the state of the UE, the network-side device sends the first switching response message to the UE. If determining not to switch the state of the UE, the network-side device sends a first switching rejection message to the UE, or the network-side device makes no response. After receiving the first switching response message sent by the network-side device, the UE determines, based on the first switching response message, that the network-side device allows the UE to switch the state, and the UE switches the state from the connected state to the ecology conservation optimization. Optionally, the first switching response message may carry first indication information. The first indication information may be used to instruct the UE to switch to the ecology conservation optimization.

In the method in this embodiment, when the uplink service volume of the UE within the first detection time is less than the first threshold, the state of the UE is switched from the connected state to the ecology conservation optimization, so that energy consumption of the UE can be reduced, and utilization of a transmission resource can be improved. Optionally, the UE may alternatively switch the transmission mode from an uplink scheduling-based transmission mode to an uplink contention-based transmission mode, which can also reduce the energy consumption of the UE, and increase the utilization of the transmission resource. Specifically, when the uplink service volume of the UE within the first detection time is less than the first threshold, the UE sends a second switching request message to the network-side device, where the second switching request message is used to request to switch the transmission mode of the UE from the uplink scheduling-based transmission mode to the uplink contention-based transmission mode.

Optionally, the second switching request message includes second switching indication information, and the second switching indication information is used to indicate that the second switching request message is used to request to switch the transmission mode of the UE from the uplink scheduling-based transmission mode to the uplink contention-based transmission mode. The second switching indication information may be denoted as an indicator value of one bit. The network-side device learns, according to the second switching indication information, that the UE requests to switch the transmission mode to the uplink contention-based transmission mode, and further determines whether to switch the transmission mode of the UE.

Optionally, the second switching request message includes the information about the uplink service volume of the UE within the first detection time. The information about the uplink service volume is the value of the uplink service volume of the UE within the first detection time or the level of the uplink service volume. The network-side device determines, based on the information about the uplink service volume within the first detection time, whether to switch the transmission mode of the UE. If determining to switch the transmission mode of the UE, the network-side device sends a second switching response message to the UE. If determining not to switch the transmission mode of the UE, the network-side device sends a second switching rejection message to the UE, or the network-side device makes no response. The UE receives the second switching response message sent by the network-side device, and switches the transmission mode from the uplink scheduling-based transmission mode to the uplink contention-based transmission mode based on the second switching response message. Optionally, the second switching response message may carry second indication information. The second indication information may be used to instruct the UE to switch the transmission mode from the uplink scheduling-based transmission mode to the uplink contention-based transmission mode.

Figure 3:
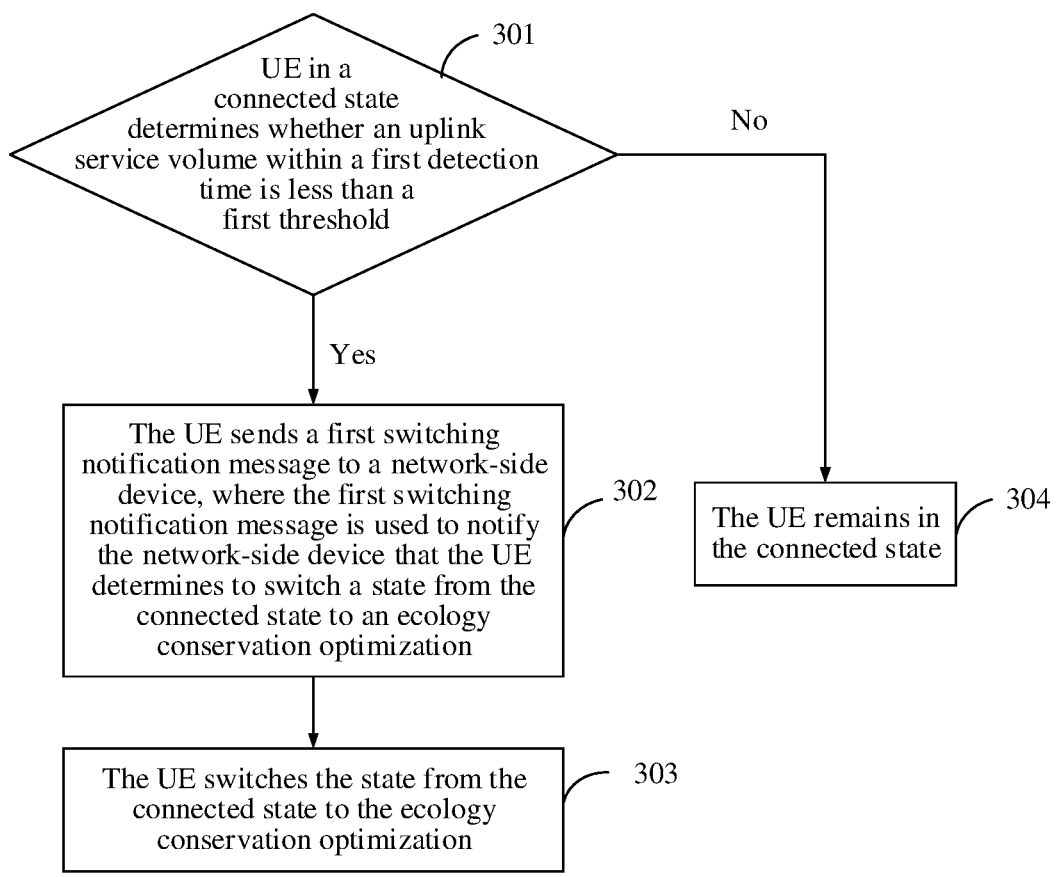
FIG. 3 is a flowchart of a transmission mode switching method according to Embodiment 3 of this application.

FIG. 3 is a flowchart of a transmission mode switching method according to Embodiment 3 of this application. As shown in FIG. 3, a difference between this embodiment and the embodiment shown in FIG. 2 lies in that in this embodiment, UE determines state switching. The method in this embodiment may include the following steps.

Step 301: The UE in a connected state determines whether an uplink service volume within a first detection time is less than a first threshold.

If the uplink service volume of the UE within the first detection time is less than the first threshold, the UE performs step 302. If the uplink service volume of the UE within the first detection time is greater than or equal to the first threshold, the UE performs step 304.

Step 302: The UE sends a first switching notification message to a network-side device, where the first switching notification message is used to notify the network-side device that the UE determines to switch a state from the connected state to an ecology conservation optimization.

Step 303: The UE switches the state from the connected state to the ecology conservation optimization.

Step 304: The UE remains in the connected state.

In step 301, the UE determines whether the uplink service volume within the first detection time is less than the first threshold. For a specific determining manner, refer to related descriptions of step 101 in Embodiment 1. Details are not described herein again. If the uplink service volume of the UE within the first detection time is less than the first threshold, the UE sends the first switching notification message to the network-side device, where the first switching notification message is used to notify the network-side device that the UE determines to switch the state from the connected state to the ecology conservation optimization, so that the network-side device can learn of the state of the UE. Optionally, the first switching notification message may carry indication information. The indication information may be used to indicate that the state of the UE is to be switched from the connected state to the ecology conservation optimization. Then, the UE switches the state from the connected state to the ecology conservation optimization, or the UE may switch the state from the connected state to the ecology conservation optimization when receiving an acknowledgement message of the first switching notification message that is sent by the network-side device and received by the UE. Certainly, the UE may alternatively first switch the state from the connected state to the ecology conservation optimization, and then notify the network-side device that the state of the UE is changed. Optionally, after receiving the first switching notification message, the network-side device may further notify a core network that the state of the UE is switched from the connected state to the ecology conservation optimization, to implement state synchronization of the UE.

In the method in this embodiment, when the uplink service volume of the UE within the first detection time is less than the first threshold, the UE switches the state from the connected state to the ecology conservation optimization, so that energy consumption of the UE can be reduced, and utilization of a transmission resource can be increased. Optionally, the UE may alternatively switch the transmission mode from an uplink scheduling-based transmission mode to an uplink contention-based transmission mode, which can also reduce the energy consumption of the UE.

Specifically, when the uplink service volume of the UE within the first detection time is less than the first threshold, the UE sends a second switching notification message to the network-side device, where the second switching notification message is used to notify the network-side device that the UE determines to switch the transmission mode from the uplink scheduling-based transmission mode to the uplink contention-based transmission mode. Optionally, the second switching notification message may carry indication information. The indication information may be used to indicate that the transmission mode is to be switched to the uplink contention-based transmission mode. Then, the UE switches the transmission mode from the uplink scheduling-based transmission mode to the uplink contention-based transmission mode, or the UE may switch the transmission mode from the uplink scheduling-based transmission mode to the uplink contention-based transmission mode when receiving an acknowledgement message of the second switching notification message that is sent by the network-side device and received by the UE. Certainly, the UE may alternatively first switch the transmission mode from the uplink scheduling-based transmission mode to the uplink contention-based transmission mode, and then notify the network-side device that the transmission mode is changed.

In Embodiment 1 to Embodiment 3, the network-side device or the UE switches the state or the transmission mode based on the value of the uplink service volume of the UE. It may be understood that whether to switch the state or the transmission mode may further be determined with reference to both the uplink service volume of the UE and a value of a downlink service volume of the UE. For example, although the uplink service volume of the UE is very small, a large volume of downlink services keeps being transmitted. In this case, the state of the UE should not be switched to the ecology conservation optimization nor the transmission mode should not be switched to the uplink contention-based transmission mode.

Specifically, after determining that the uplink service volume within the first detection time is less than the first threshold, the UE further determines whether a downlink service volume of the UE within the first detection time is less than a third threshold. The third threshold may be the same as or different from the first threshold. The third threshold is greater than 0. When the downlink service volume of the UE within the first detection time is less than the third threshold, the UE switches the state from the connected state to the ecology conservation optimization, or the UE switches the transmission mode from the uplink scheduling-based transmission mode to the uplink contention-based transmission mode. That the uplink service volume of the UE within the first detection time is less than the first threshold and the downlink service volume of the UE within the first detection time is less than the third threshold indicates that the uplink service volume and the downlink service volume of the UE are both very small, and that the UE switches the state from the connected state to the ecology conservation optimization or switches the transmission mode from the uplink scheduling-based transmission mode to the uplink contention-based transmission mode does not affect transmission of uplink data and downlink data of the UE, and can reduce the energy consumption of the UE.

Figure 4:
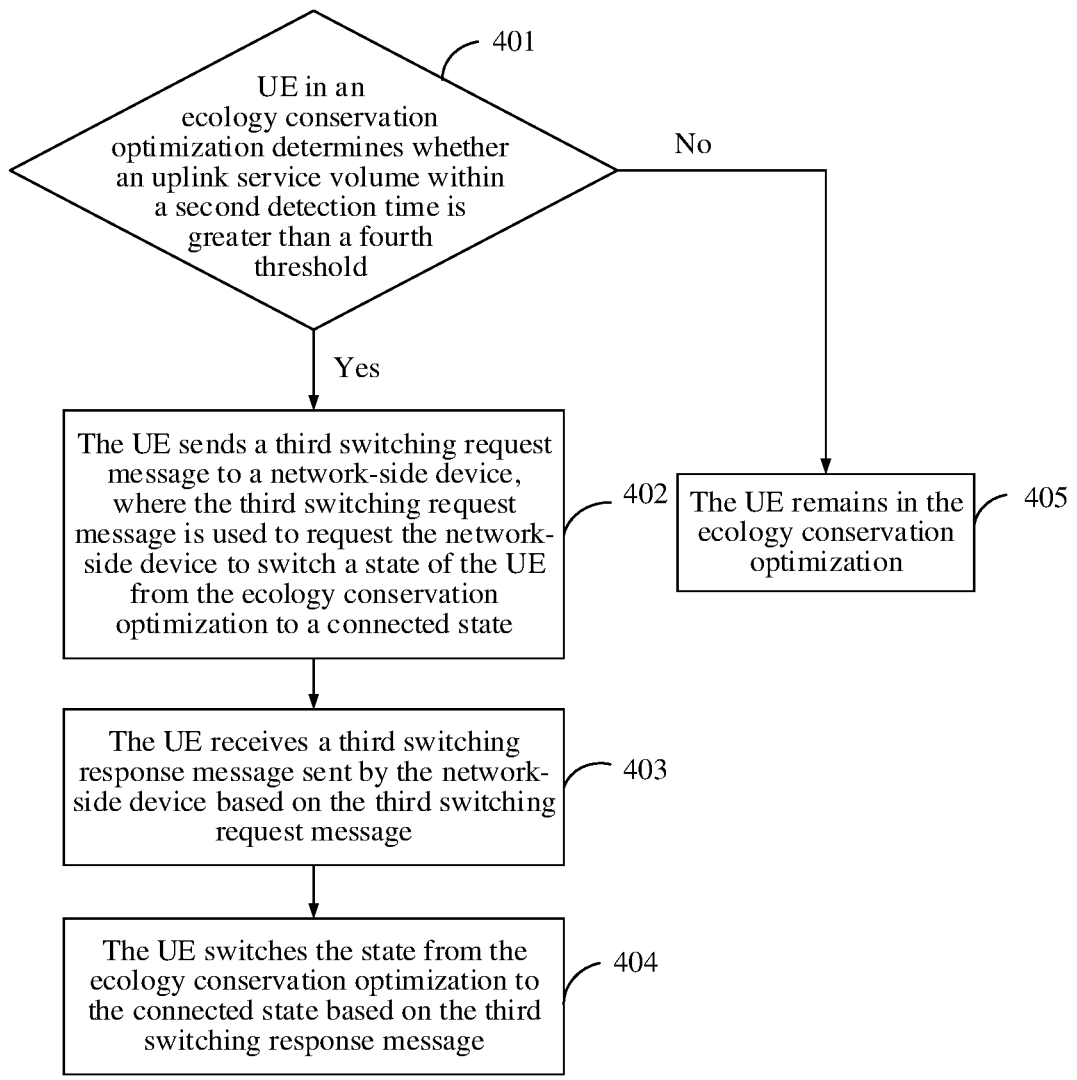
FIG. 4 is a flowchart of a transmission mode switching method according to Embodiment 4 of this application.

FIG. 4 is a flowchart of a transmission mode switching method according to Embodiment 4 of this application. The method in this embodiment may be based on the methods in Embodiment 1 to Embodiment 3, that is, applied after UE switches a state from a connected state to an ecology conservation optimization, or may be independent of the methods in Embodiment 1 to Embodiment 3, that is, when UE is in an ecology conservation optimization, the method in this embodiment may be used. As shown in FIG. 4, the method provided in this embodiment may include the following steps.

Step 401: The UE in the ecology conservation optimization determines whether an uplink service volume within a second detection time is greater than a fourth threshold.

If the uplink service volume of the UE within the second detection time is greater than the fourth threshold, the UE performs step 402. If the uplink service volume of the UE within the second detection time is less than or equal to the fourth threshold, the UE performs step 405.

Step 402: The UE sends a third switching request message to a network-side device, where the third switching request message is used to request the network-side device to switch the state of the UE from the ecology conservation optimization to the connected state.

Step 403: The UE receives a third switching response message sent by the network-side device based on the third switching request message.

Step 404: The UE switches the state from the ecology conservation optimization to the connected state based on the third switching response message.

Step 405: The UE remains in the ecology conservation optimization.

After the UE is in the ecology conservation optimization, if an uplink service volume of the UE becomes larger, a transmission mode in the ecology conservation optimization cannot satisfy a requirement of the UE on uplink data transmission, and the UE also needs to switch the state. Specifically, the UE determines whether the uplink service volume within the second detection time is greater than the fourth threshold. The second detection time may be the same as or different from the first detection time. The fourth threshold may be the same as or different from the first threshold. The fourth threshold is greater than 0. The second detection time may be a time value pre-configured by an operator or a device vendor for the UE and the network-side device. When the UE and the network-side device are at delivery, the second detection time is already stored in memories of the UE and the network-side device by the operator or the device vendor. Alternatively, the second detection time is a time value configured by the network-side device for the UE. Specifically, the network-side device may configure the second detection time for the UE by using a broadcast message, or the network-side device configures the second detection time for the UE by using dedicated RRC signaling.

In step 401, in an implementation, the UE detects whether a current uplink service volume is greater than a fifth threshold. The fifth threshold is less than or equal to the fourth threshold. When detecting that the current uplink service volume is greater than the fifth threshold, the UE enables a second timer. If an uplink service volume of the UE is always greater than the fourth threshold within a runtime of the second timer, after timing of the second timer expires, the UE determines that the uplink service volume of the UE within the second detection time is greater than the fourth threshold. If an uplink service volume of the UE at any time is less than the fourth threshold within a runtime of the second timer, the UE resets the second timer.

In this embodiment, the uplink service volume of the UE within the second detection time includes at least any one of the following service volumes: a size of data that needs to be transmitted in an uplink buffer of the UE within the second detection time, a size of data that needs to be transmitted in an uplink buffer of the UE within each scheduling period within the second detection time, a size of an uplink data packet sent by the UE each time within the second detection time, a service volume of any application within the second detection time, a service volume of any type of service within the second detection time, a volume of data transmitted on any logical channel within the second detection time, and a volume of data transmitted in any logical channel group within the second detection time. Optionally, the uplink service volume of the UE within the second detection time may alternatively be a plurality of the foregoing service volumes.

When the uplink service volume of the UE within the second detection time is greater than the fourth threshold, the UE sends the third switching request message to the network-side device, where the third switching request message is used to request the network-side device to switch the state of the UE from the ecology conservation optimization to the connected state. Optionally, the third switching request message includes third switching indication information, and the third switching indication information is used to indicate that the third switching request message is used to request the network-side device to switch the state of the UE from the ecology conservation optimization to the connected state. After receiving the third switching request message, the network-side device learns, according to the third switching indication information, that the UE requests to switch from the ecology conservation optimization to the connected state, and the network-side device determines whether to switch the state of the UE.

Optionally, the third switching request message includes information about the uplink service volume of the UE within the second detection time. The information about the uplink service volume is a value of the uplink service volume of the UE within the second detection time or a level of the uplink service volume. The network-side device determines, based on the information about the uplink service volume of the UE within the second detection time, whether to switch the state of the UE. If determining to switch the state of the UE, the network-side device sends the third switching response message to the UE. If determining not to switch the state of the UE, the network-side device sends a third switching rejection message to the UE, or the network-side device makes no response. After receiving the third switching response message sent by the network-side device, the UE determines, based on the third switching response message, that the network-side device allows the UE to switch the state, and the UE switches the state from the ecology conservation optimization to the connected state. Optionally, the third switching response message may carry third indication information. The third indication information may be used to instruct the UE to switch to the connected state.

In the solution of this embodiment, the network-side device determines whether to switch the state of the UE from the ecology conservation optimization to the connected state. It may be understood that, alternatively, the UE may determine whether to switch the state from the ecology conservation optimization to the connected state. When determining to switch the state from the ecology conservation optimization to the connected state, the UE may send a third switching notification message to the network-side device, to notify the network-side device that the UE determines to switch the state from the ecology conservation optimization to the connected state, and then the UE switches the state from the ecology conservation optimization to the connected state. Optionally, the third switching notification message may carry indication information. The indication information may be used to indicate that the state of the UE is to be switched from the ecology conservation optimization to the connected state. The UE may alternatively switch the state from the ecology conservation optimization to the connected state when receiving an acknowledgement message of the third switching notification message that is sent by the network-side device and received by the UE. Alternatively, the UE may first switch the state from the ecology conservation optimization to the connected state, and then notify the network-side device that the state is switched.

In this embodiment, when the uplink service volume of the UE within the second detection time is greater than the fourth threshold, it indicates that the uplink service volume of the UE is large. The transmission mode in the ecology conservation optimization cannot satisfy the requirement on uplink data transmission. The UE requests the network-side device to switch the state of the UE from the ecology conservation optimization to the connected state. An uplink scheduling-based transmission mode in the connected state can satisfy the requirement on uplink data transmission, so that the state of the UE can be adapted to a service volume of the UE, and utilization of a transmission resource is increased.

Figure 5:
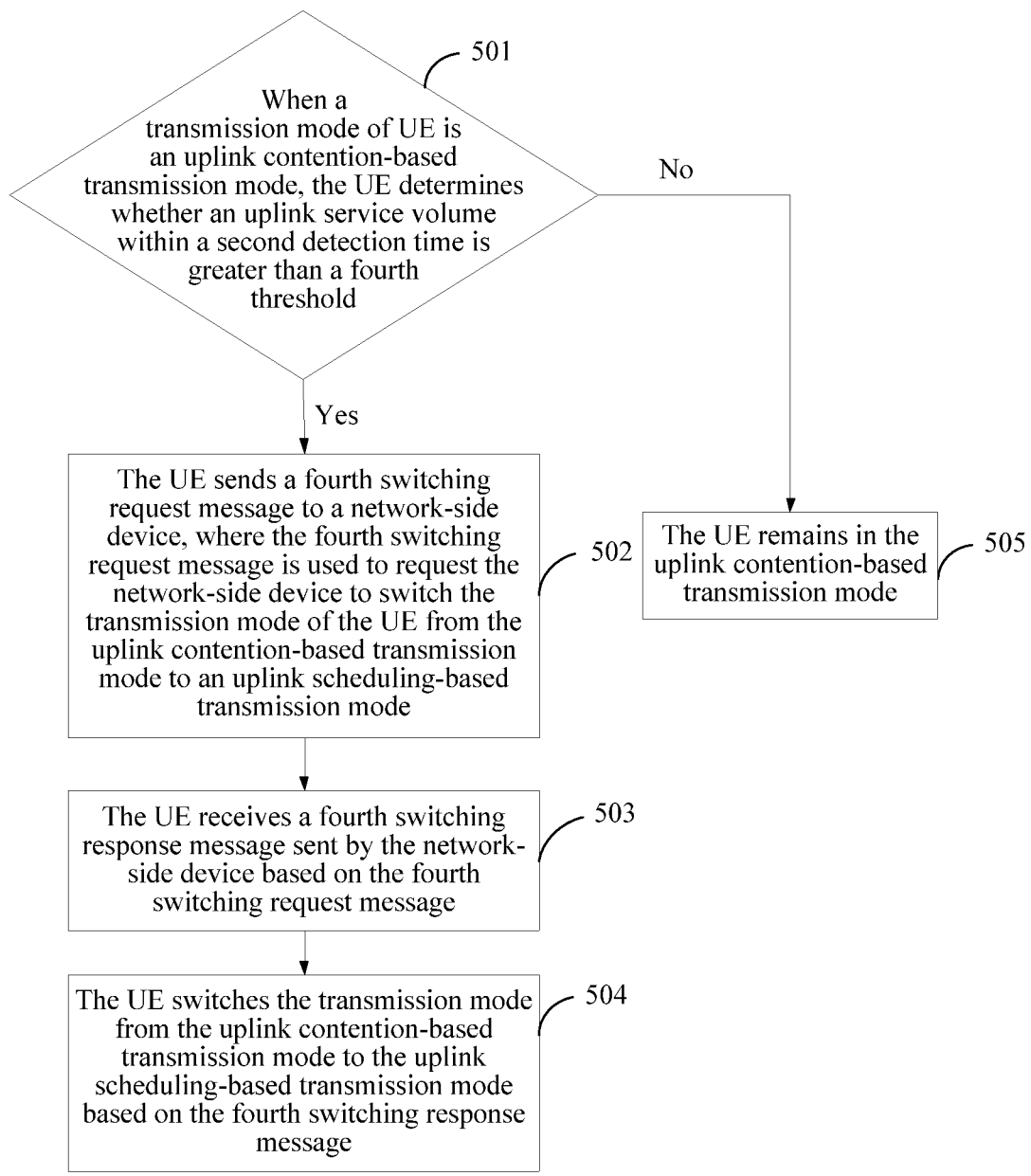
FIG. 5 is a flowchart of a transmission mode switching method according to Embodiment 5 of this application.

FIG. 5 is a flowchart of a transmission mode switching method according to Embodiment 5 of this application. The method in this embodiment may be based on the methods in Embodiment 1 to Embodiment 3, that is, applied after UE switches a transmission mode from a scheduling-based transmission mode to an uplink contention-based transmission mode, or may be independent of the methods in Embodiment 1 to Embodiment 3, that is, when UE is in an uplink contention-based transmission mode, the method in this embodiment may be used. As shown in FIG. 5, the method in this embodiment may include the following steps.

Step 501: When the transmission mode of the UE is the uplink contention-based transmission mode, the UE determines whether an uplink service volume within a second detection time is greater than a fourth threshold.

If the uplink service volume of the UE within the second detection time is greater than the fourth threshold, the UE performs step 502. If the uplink service volume of the UE within the second detection time is less than or equal to the fourth threshold, the UE performs step 505.

Step 502: The UE sends a fourth switching request message to a network-side device, where the fourth switching request message is used to request the network-side device to switch the transmission mode of the UE from the uplink contention-based transmission mode to an uplink scheduling-based transmission mode.

Step 503: The UE receives a fourth switching response message sent by the network-side device based on the fourth switching request message.

Step 504: The UE switches the transmission mode from the uplink contention-based transmission mode to the uplink scheduling-based transmission mode based on the fourth switching response message.

Step 505: The UE maintains the uplink contention-based transmission mode.

In step 501, the UE determines whether the uplink service volume within the second detection time is greater than the fourth threshold. For a specific determining manner, refer to related descriptions of step 401 in Embodiment 4. Details are not described herein again. In this embodiment, when the uplink service volume of the UE within the second detection time is greater than the fourth threshold, the UE sends the fourth switching request message to the network-side device, where the fourth switching request message is used to request the network-side device to switch the transmission mode of the UE from the uplink contention-based transmission mode to the uplink scheduling-based transmission mode. The uplink service volume of the UE within the second detection time includes at least any one of the following service volumes: a size of data that needs to be transmitted in an uplink buffer of the UE within the second detection time, a size of data that needs to be transmitted in an uplink buffer of the UE within each scheduling period within the second detection time, a size of an uplink data packet sent by the UE each time within the second detection time, a service volume of any application within the second detection time, a service volume of any type of service within the second detection time, a volume of data transmitted on any logical channel within the second detection time, and a volume of data transmitted in any logical channel group within the second detection time. Optionally, the uplink service volume of the UE within the second detection time may alternatively be a plurality of the foregoing service volumes.

Optionally, the fourth switching request message includes fourth switching indication information. The fourth switching indication information is used to indicate that the fourth switching request message is used to request the network-side device to switch the transmission mode of the UE from the uplink contention-based transmission mode to the uplink scheduling-based transmission mode. After receiving the fourth switching request message, the network-side device learns, according to the fourth switching indication information, that the UE requests to switch the transmission mode from the uplink contention-based transmission mode to the uplink scheduling-based transmission mode, and the network-side device determines whether to switch the transmission mode of the UE.

Optionally, the fourth switching request message includes information about the uplink service volume of the UE within the second detection time. The information about the uplink service volume is a value of the uplink service volume of the UE within the second detection time or a level of the uplink service volume. The network-side device determines, based on the information about the uplink service volume of the UE within the second detection time, whether to switch the transmission mode of the UE.

If determining to switch the transmission mode of the UE, the network-side device sends the fourth switching response message to the UE. If determining not to switch the state of the UE, the network-side device sends a fourth switching rejection message to the UE, or the network-side device makes no response. After receiving the fourth switching response message sent by the network-side device, the UE determines, based on the fourth switching response message, that the network-side device allows the UE to switch the transmission mode, and the UE switches the transmission mode from the uplink contention-based transmission mode to the uplink scheduling-based transmission mode. Optionally, the fourth switching response message may carry fourth indication information. The fourth indication information may be used to instruct the UE to switch the transmission mode from the uplink contention-based transmission mode to the uplink scheduling-based transmission mode.

In addition, it should be noted that the first threshold, the second threshold, the third threshold, the fourth threshold, and the fifth threshold that are mentioned in Embodiment 1 to Embodiment 5 may be pre-configured in memories of the UE and the network-side device when the UE and the network-side device are at delivery, or may be configured by the network-side device for the UE in running processes of the UE and the network-side device. Specifically, the network-side device may configure the first threshold, the second threshold, the third threshold, the fourth threshold, and the fifth threshold for the UE by using a broadcast message or by using dedicated RRC signaling. Certainly, the first threshold, the second threshold, the third threshold, the fourth threshold, and the fifth threshold may alternatively be set in other manners. This is not limited herein.

Figure 6:
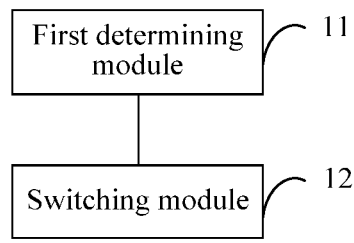
FIG. 6 is a schematic structural diagram of UE according to Embodiment 6 of this application.

FIG. 6 is a schematic structural diagram of UE according to Embodiment 6 of this application. As shown in FIG. 6, the UE in this embodiment includes a first determining module 11 and a switching module 12.

The first determining module 11 is configured to determine whether an uplink service volume of the UE within a first detection time is less than a first threshold when the UE is in a connected state.

The switching module 12 is configured to: when the uplink service volume of the UE within the first detection time is less than the first threshold, switch a state of the UE from the connected state to an ecology conservation optimization, or switch a transmission mode of the UE from an uplink scheduling-based transmission mode to an uplink contention-based transmission mode.

In this embodiment, the uplink service volume of the UE within the first detection time includes any one of the following service volumes: a size of data that needs to be transmitted in an uplink buffer of the UE within the first detection time, a size of data that needs to be transmitted in an uplink buffer of the UE within each scheduling period within the first detection time, a size of an uplink data packet sent by the UE each time within the first detection time, a service volume of any application within the first detection time, a service volume of any type of service within the first detection time, a volume of data transmitted on any logical channel within the first detection time, and a volume of data transmitted in any logical channel group within the first detection time.

Optionally, the first determining module 11 is specifically configured to: determine whether a current uplink service volume of the UE is less than a second threshold; when the current uplink service volume of the UE is less than the second threshold, enable a first timer; and if an uplink service volume of the UE is always less than the first threshold within a runtime of the first timer, determine that the uplink service volume of the UE within the first detection time is less than the first threshold. The second threshold is greater than or equal to the first threshold. The runtime of the first timer is equal to the first detection time.

Optionally, the UE in this embodiment further includes a second determining module (not shown in FIG. 6). The second determining module is configured to determine whether a downlink service volume of the UE within the first detection time is less than a third threshold. The switching module 12 is specifically configured to: when the downlink service volume of the UE within the first detection time is less than the third threshold, switch the state of the UE from the connected state to the ecology conservation optimization, or switch the transmission mode of the UE from the uplink scheduling-based transmission mode to the uplink contention-based transmission mode.

The UE in this embodiment may be configured to perform the method in Embodiment 1. Their specific implementations and technical effects are similar. Details are not described herein again.

Figure 7:
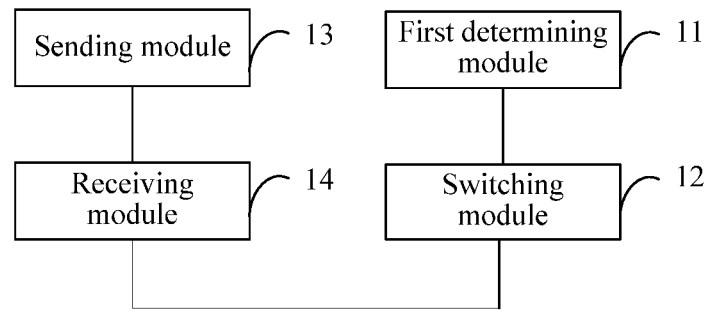
FIG. 7 is a schematic structural diagram of UE according to Embodiment 7 of this application.

FIG. 7 is a schematic structural diagram of UE according to Embodiment 7 of this application. As shown in FIG. 7, based on the UE shown in FIG. 6, the UE in this embodiment further includes a sending module 13 and a receiving module 14.

The sending module 13 is configured to send a first switching request message to a network-side device, where the first switching request message is used to request the network-side device to switch the state of the UE from the connected state to the ecology conservation optimization. The receiving module 14 is configured to receive a first switching response message sent by the network-side device based on the first switching request message. The switching module 12 is specifically configured to switch the state of the UE from the connected state to the ecology conservation optimization based on the first switching response message. Optionally, the first switching response message may carry first indication information. The first indication information may be used to instruct the UE to switch to the ecology conservation optimization.

Optionally, the first switching request message includes first switching indication information and/or information about the uplink service volume of the UE within the first detection time. The first switching indication information is used to indicate that the first switching request message is used to request the network-side device to switch the state of the UE from the connected state to the ecology conservation optimization.

Alternatively, the sending module 13 is configured to send a second switching request message to a network-side device, where the second switching request message is used to request the network-side device to switch the transmission mode of the UE from the uplink scheduling-based transmission mode to the uplink contention-based transmission mode. The receiving module 14 is configured to receive a second switching response message sent by the network-side device based on the second switching request message. The switching module 12 is specifically configured to switch the transmission mode of the UE from the uplink scheduling-based transmission mode to the uplink contention-based transmission mode based on the second switching response message. Optionally, the second switching response message may carry second indication information. The second indication information may be used to instruct the UE to switch the transmission mode from the uplink scheduling-based transmission mode to the uplink contention-based transmission mode.

Optionally, the second switching request message includes second switching indication information and/or information about the uplink service volume of the UE within the first detection time, and the second switching indication information is used to indicate that the second switching request message is used to request the network-side device to switch the transmission mode of the UE from the uplink scheduling-based transmission mode to the uplink contention-based transmission mode.

Alternatively, the sending module 13 is configured to send a first switching notification message to a network-side device, where the first switching notification message is used to notify the network-side device that the UE determines to switch the state from the connected state to the ecology conservation optimization. Optionally, the first switching notification message may carry indication information. The indication information may be used to indicate that the state of the UE is to be switched from the connected state to the ecology conservation optimization. Then, the switching module 12 switches the state of the UE from the connected state to the ecology conservation optimization.

Alternatively, the sending module 13 is configured to send a second switching notification message to a network-side device, where the second switching notification message is used to notify the network-side device that the UE determines to switch the transmission mode from the uplink scheduling-based transmission mode to the uplink contention-based transmission mode. Optionally, the second switching notification message may carry indication information. The indication information may be used to indicate that the transmission mode is to be switched to the uplink contention-based transmission mode. Then, the switching module 12 switches the transmission mode of the UE from the uplink scheduling-based transmission mode to the uplink contention-based transmission mode.

The UE in this embodiment may be configured to perform the methods in Embodiment 2 and Embodiment 3. Their specific implementations and technical effects are similar. Details are not described herein again.

Figure 8:
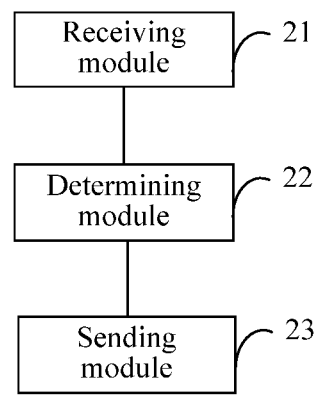
FIG. 8 is a schematic structural diagram of a network-side device according to Embodiment 8 of this application.

FIG. 8 is a schematic structural diagram of a network-side device according to Embodiment 8 of this application. As shown in FIG. 8, the network-side device in this embodiment includes a receiving module 21, a determining module 22, and a sending module 23.

The receiving module 21 is configured to receive a first switching request message sent by UE, where the first switching request message is used to request the network-side device to switch a state of the UE from the connected state to the ecology conservation optimization.

The determining module 22 is configured to determine, based on the first switching request message, to switch the state of the UE from the connected state to the ecology conservation optimization.

The sending module 23 is configured to send a first switching response message to the UE, where the first switching response message is used to instruct the UE to switch the state from the connected state to the ecology conservation optimization. Optionally, the first switching response message may carry first indication information. The first indication information may be used to instruct the UE to switch to the ecology conservation optimization.

The network-side device in this embodiment may be configured to perform the method in Embodiment 2. Their specific implementations and technical effects are similar. Details are not described herein again.

Embodiment 9 of this application provides a network-side device. For a structure of the network-side device provided in this embodiment, refer to the network-side device shown in FIG. 8. The network-side device is configured as follows.

A receiving module 21 is configured to receive a second switching request message sent by UE, where the second switching request message is used to request the network-side device to switch a transmission mode of the UE from the uplink scheduling-based transmission mode to the uplink contention-based transmission mode.

A determining module 22 is configured to determine, based on the second switching request message, to switch the transmission mode of the UE from the uplink scheduling-based transmission mode to the uplink contention-based transmission mode.

A sending module 23 is configured to send a second switching response message to the UE, where the second switching response message is used to instruct the UE to switch the transmission mode from the uplink scheduling-based transmission mode to the uplink contention-based transmission mode. Optionally, the second switching response message may carry second indication information. The second indication information may be used to instruct the UE to switch the transmission mode from the uplink scheduling-based transmission mode to the uplink contention-based transmission mode.

The network-side device in this embodiment may be configured to perform the method in Embodiment 2. Their specific implementations and technical effects are similar. Details are not described herein again.

Figure 9:
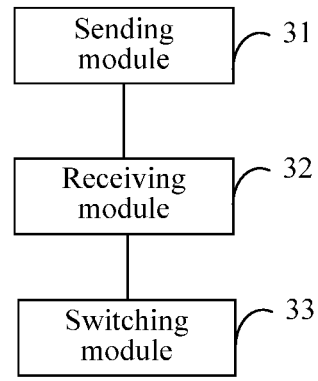
FIG. 9 is a schematic structural diagram of UE according to Embodiment 10 of this application.

FIG. 9 is a schematic structural diagram of UE according to Embodiment 10 of this application. As shown in FIG. 9, the UE in this embodiment includes a sending module 31, a receiving module 32, and a switching module 33.

The sending module 31 is configured to: when the UE is in an ecology conservation optimization and an uplink service volume of the UE within a second detection time is greater than a fourth threshold, send a third switching request message to a network-side device, where the third switching request message is used to request the network-side device to switch a state of the UE from the ecology conservation optimization to a connected state.

The receiving module 32 is configured to receive a third switching response message sent by the network-side device based on the third switching request message.

The switching module 33 is configured to switch the state of the UE from the ecology conservation optimization to the connected state based on the third switching response message.

Optionally, the third switching response message may carry third indication information. The third indication information may be used to instruct the UE to switch to the connected state.

Optionally, the UE further includes a determining module (not shown in FIG. 9). The determining module is configured to: detect whether a current uplink service volume is greater than a fifth threshold, where the fifth threshold is less than or equal to the fourth threshold; when the current uplink service volume of the UE is greater than the fifth threshold, enable a second timer; and if an uplink service volume of the UE is greater than the fourth threshold within a runtime of the second timer, determine that the uplink service volume of the UE within the second detection time is greater than the fourth threshold, where the runtime of the second timer is equal to the second detection time.

The UE in this embodiment may be configured to perform the method in Embodiment 4. Their specific implementations and technical effects are similar. Details are not described herein again.

Embodiment 11 of this application provides UE. For a structure of the UE provided in this embodiment, refer to the UE shown in FIG. 9. The UE is configured as follows.

A sending module 31 is configured to: when a transmission mode of the UE is an uplink contention-based transmission mode and an uplink service volume of the UE within a second detection time is greater than a fourth threshold, send a fourth switching request message to a network-side device, where the fourth switching request message is used to request the network-side device to switch the transmission mode of the UE from the uplink contention-based transmission mode to an uplink scheduling-based transmission mode.

A receiving module 32 is configured to receive a fourth switching response message sent by the network-side device based on the fourth switching request message.

A switching module 33 is configured to switch the transmission mode of the UE from the uplink contention-based transmission mode to the uplink scheduling-based transmission mode based on the fourth switching response message. Optionally, the fourth switching response message may carry fourth indication information. The fourth indication information may be used to instruct the UE to switch the transmission mode from the uplink contention-based transmission mode to the uplink scheduling-based transmission mode.

Optionally, the UE further includes a determining module (not shown in FIG. 9). The determining module is configured to: detect whether a current uplink service volume is greater than a fifth threshold, where the fifth threshold is less than or equal to the fourth threshold; when the current uplink service volume of the UE is greater than the fifth threshold, enable a second timer; and if an uplink service volume of the UE is greater than the fourth threshold within a runtime of the second timer, determine that the uplink service volume of the UE within the second detection time is greater than the fourth threshold, where the runtime of the second timer is equal to the second detection time.

The UE in this embodiment may be configured to perform the method in Embodiment 5. Their specific implementations and technical effects are similar. Details are not described herein again.

Embodiment 12 of this application provides a network-side device. For a structure of the network-side device provided in this embodiment, refer to the network-side device shown in FIG. 8. The network-side device is configured as follows.

A receiving module 21 is configured to receive a third switching request message sent by UE, where the third switching request message is used to request the network-side device to switch a state of the UE from the ecology conservation optimization to the connected state.

A determining module 22 is configured to determine, based on the third switching request, to switch the state of the UE from the ecology conservation optimization to the connected state.

A sending module 23 is configured to send a third switching response message to the UE, where the third switching response message is used to instruct the UE to switch the state from the ecology conservation optimization to the connected state. Optionally, the third switching response message may carry third indication information. The third indication information may be used to instruct the UE to switch to the connected state.

The network-side device in this embodiment may be configured to perform the method in Embodiment 4. Their specific implementations and technical effects are similar. Details are not described herein again.

Embodiment 13 of this application provides a network-side device. For a structure of the network-side device provided in this embodiment, refer to the network-side device shown in FIG. 8. The network-side device is configured as follows.

A receiving module 21 is configured to receive a fourth switching request message sent by UE, where the fourth switching request message is used to request the network-side device to switch a transmission mode of the UE from the uplink contention-based transmission mode to the uplink scheduling-based transmission mode.

A determining module 22 is configured to determine, based on the fourth switching request message, to switch the transmission mode of the UE from the uplink contention-based transmission mode to the uplink scheduling-based transmission mode.

A sending module 23 is configured to send a fourth switching response message to the UE, where the fourth switching response message is used to instruct the UE to switch the transmission mode from the uplink contention-based transmission mode to the uplink scheduling-based transmission mode. Optionally, the fourth switching response message may carry fourth indication information. The fourth indication information may be used to instruct the UE to switch the transmission mode from the uplink contention-based transmission mode to the uplink scheduling-based transmission mode.

The network-side device in this embodiment may be configured to perform the method in Embodiment 5. Their specific implementations and technical effects are similar. Details are not described herein again.

Figure 10:
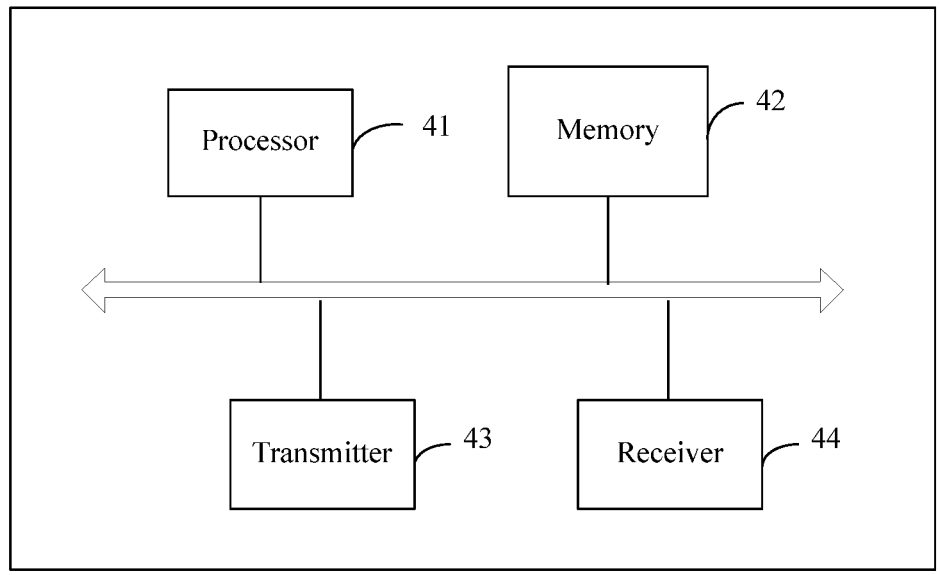
FIG. 10 is a schematic structural diagram of UE according to Embodiment 14 of this application.

FIG. 10 is a schematic structural diagram of UE according to Embodiment 14 of this application. As shown in FIG. 10, the UE in this embodiment includes a processor 41 and a memory 42. The memory 42 is configured to store a program. The processor 41 invokes the program stored in the memory 42, to enable the UE to perform the following method: when the UE is in a connected state and an uplink service volume of the UE within a first detection time is less than a first threshold, switching a state of the UE from the connected state to an ecology conservation optimization, or switching a transmission mode of the UE from an uplink scheduling-based transmission mode to an uplink contention-based transmission mode.

Optionally, the processor 41 is further configured to: determine whether a current uplink service volume is less than a second threshold, where the second threshold is greater than or equal to the first threshold; when the current uplink service volume is less than the second threshold, enable a first timer; and if an uplink service volume of the UE is always less than the first threshold within a runtime of the first timer, determine that the uplink service volume of the UE within the first detection time is less than the first threshold, where the runtime of the first timer is equal to the first detection time. If an uplink service volume of the UE at any time is greater than the first threshold within a runtime of the first timer, the UE resets the first timer.

Optionally, the UE further includes a transmitter 43 and a receiver 44. The memory 42, the transmitter 43 and the receiver 44 are connected to and communicate with the processor 41 by using a system bus.

In an implementation, the transmitter 43 is configured to send a first switching request message to a network-side device, where the first switching request message is used to request the network-side device to switch the state of the UE from the connected state to the ecology conservation optimization. The receiver 44 is configured to receive a first switching response message sent by the network-side device based on the first switching request message. Correspondingly, the processor 41 is specifically configured to switch the state from the connected state to the ecology conservation optimization based on the first switching response message. Optionally, the first switching response message may carry first indication information. The first indication information may be used to instruct the UE to switch to the ecology conservation optimization.

In another implementation, the transmitter 43 is configured to send a second switching request message to a network-side device, where the second switching request message is used to request the network-side device to switch the transmission mode of the UE from the uplink scheduling-based transmission mode to the uplink contention-based transmission mode. The receiver 44 is configured to receive a second switching response message sent by the network-side device based on the second switching request message. Correspondingly, the processor 41 is specifically configured to switch the transmission mode from the uplink scheduling-based transmission mode to the uplink contention-based transmission mode based on the second switching response message. Optionally, second switching response message may carry second indication information. The second indication information may be used to instruct the UE to switch the transmission mode from the uplink scheduling-based transmission mode to the uplink contention-based transmission mode.

In still another implementation, the transmitter 43 is configured to send a first switching notification message to a network-side device, where the first switching notification message is used to notify the network-side device that the UE determines to switch the state from the connected state to the ecology conservation optimization; and then the processor 41 switches the state of the UE from the connected state to the ecology conservation optimization. Optionally, the first switching notification message may carry indication information. The indication information may be used to indicate that the state of the UE is to be switched from the connected state to the ecology conservation optimization.

In yet another implementation, the transmitter 43 is configured to send a second switching notification message to a network-side device, where the second switching notification message is used to notify the network-side device that the UE determines to switch the transmission mode from the uplink scheduling-based transmission mode to the uplink contention-based transmission mode; and then the processor 41 switches the transmission mode of the UE from the uplink scheduling-based transmission mode to the uplink contention-based transmission mode. Optionally, the second switching notification message may carry indication information. The indication information may be used to indicate that the transmission mode is to be switched to the uplink contention-based transmission mode.

Optionally, the processor 41 is further configured to: before the state of the UE is switched from the connected state to the ecology conservation optimization or the transmission mode of the UE is switched from the uplink scheduling-based transmission mode to the uplink contention-based transmission mode, determine whether a downlink service volume within the first detection time is less than a third threshold; and when the downlink service volume within the first detection time is less than the third threshold, switch the state of the UE from the connected state to the ecology conservation optimization; or switch the transmission mode of the UE from the uplink scheduling-based transmission mode to the uplink contention-based transmission mode.

The UE in this embodiment may be configured to perform the methods in Embodiment 1 to Embodiment 3. Their specific implementations and technical effects are similar. Details are not described herein again.

Figure 11:
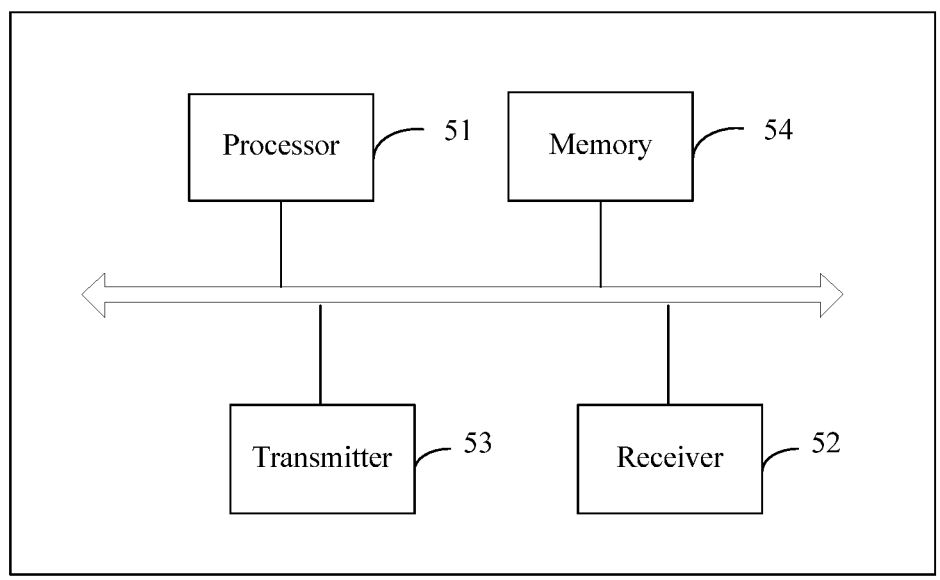
FIG. 11 is a schematic structural diagram of a network-side device according to Embodiment 15 of this application.

FIG. 11 is a schematic structural diagram of a network-side device according to Embodiment 15 of this application. As shown in FIG. 11, the network-side device provided in this embodiment includes a processor 51, a receiver 52, a transmitter 53, and a memory 54. The memory 54, the receiver 52, and the transmitter 53 are connected to and communicate with the processor 51 by using a bus. The memory 54 is configured to store a program. The processor 51 invokes the program stored in the memory 54. The transmitter 53 is configured to send data to another device. The receiver 52 is configured to receive data sent from another device.

In this embodiment, the receiver 52 is configured to receive a first switching request message sent by UE, where the first switching request message is used to request the network-side device to switch a state of the UE from the connected state to the ecology conservation optimization.

The processor 51 is configured to determine, based on the first switching request message, to switch the state of the UE from the connected state to the ecology conservation optimization.

The transmitter 53 is configured to send a first switching response message to the UE, where the first switching response message is used to instruct the UE to switch the state from the connected state to the ecology conservation optimization. Optionally, the first switching response message may carry first indication information. The first indication information may be used to instruct the UE to switch to the ecology conservation optimization.

The network-side device in this embodiment may be configured to perform the method in Embodiment 2. Their specific implementations and technical effects are similar. Details are not described herein again.

Embodiment 16 of this application provides a network-side device. For a structure of the network-side device provided in this embodiment, refer to the network-side device shown in FIG. 11. The network-side device is configured as follows.

A receiver 52 is configured to receive a second switching request message sent by UE, where the second switching request message is used to request the network-side device to switch a transmission mode of the UE from the uplink scheduling-based transmission mode to the uplink contention-based transmission mode.

A processor 51 is configured to determine, based on the second switching request message, to switch the transmission mode of the UE from the uplink scheduling-based transmission mode to the uplink contention-based transmission mode.

A transmitter 53 is configured to send a second switching response message to the UE, where the second switching response message is used to instruct the UE to switch the transmission mode from the uplink scheduling-based transmission mode to the uplink contention-based transmission mode. Optionally, the second switching response message may carry second indication information. The second indication information may be used to instruct the UE to switch the transmission mode from the uplink scheduling-based transmission mode to the uplink contention-based transmission mode.

The network-side device in this embodiment may be configured to perform the method in Embodiment 2. Their specific implementations and technical effects are similar. Details are not described herein again.

Figure 12:
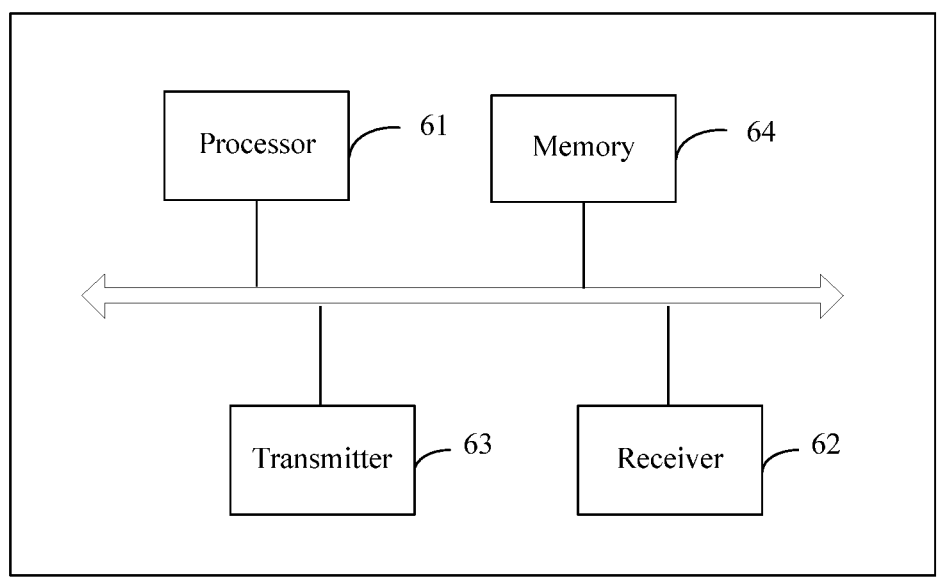
FIG. 12 is a schematic structural diagram of UE according to Embodiment 17 of this application.

FIG. 12 is a schematic structural diagram of UE according to Embodiment 17 of this application. As shown in FIG. 12, the UE provided in this embodiment includes a processor 61, a receiver 62, a transmitter 63, and a memory 64. The memory 64, the receiver 62, and the transmitter 63 are connected to and communicate with the processor 61 by using a bus. The memory 64 is configured to store a program. The processor 61 invokes the program stored in the memory 64. The transmitter 63 is configured to send data to another device. The receiver 62 is configured to receive data sent from another device.

In this embodiment, the transmitter 63 is configured to: when the UE is in an ecology conservation optimization and an uplink service volume of the UE within a second detection time is greater than a fourth threshold, send a third switching request message to a network-side device, where the third switching request message is used to request the network-side device to switch a state of the UE from the ecology conservation optimization to a connected state.

The receiver 62 is configured to receive a third switching response message sent by the network-side device based on the third switching request message. Optionally, the third switching response message may carry third indication information. The third indication information may be used to instruct the UE to switch to the connected state.

The processor 61 is configured to switch the state from the ecology conservation optimization to the connected state based on the third switching response message.

Optionally, the processor 61 is further configured to: detect whether a current uplink service volume of the UE is greater than a fifth threshold, where the fifth threshold is less than or equal to the fourth threshold; when the current uplink service volume of the UE is greater than the fifth threshold, enable a second timer; and if an uplink service volume of the UE is greater than the fourth threshold within a runtime of the second timer, determine that the uplink service volume of the UE within the second detection time is greater than the fourth threshold, where the runtime of the second timer is equal to the second detection time.

The UE in this embodiment may be configured to perform the method in Embodiment 4. Their specific implementations and technical effects are similar. Details are not described herein again.

Embodiment 18 of this application provides UE. For a structure of the UE provided in this embodiment, refer to the UE shown in FIG. 12. The UE is configured as follows.

In this embodiment, a transmitter 63 is configured to: when a transmission mode of the UE is an uplink contention-based transmission mode and an uplink service volume of the UE within a second detection time is greater than a fourth threshold, send a fourth switching request message to a network-side device, where the fourth switching request message is used to request the network-side device to switch the transmission mode of the UE from the uplink contention-based transmission mode to an uplink scheduling-based transmission mode.

A receiver 62 is configured to receive a fourth switching response message sent by the network-side device based on the fourth switching request message. Optionally, the fourth switching response message may carry fourth indication information. The fourth indication information may be used to instruct the UE to switch the transmission mode from the uplink contention-based transmission mode to the uplink scheduling-based transmission mode.

A processor 61 is configured to switch the transmission mode from the uplink contention-based transmission mode to the uplink scheduling-based transmission mode based on the fourth switching response message.

Optionally, the processor 61 is further configured to: detect whether a current uplink service volume of the UE is greater than a fifth threshold, where the fifth threshold is less than or equal to the fourth threshold; when the current uplink service volume of the UE is greater than the fifth threshold, enable a second timer; and if an uplink service volume of the UE is greater than the fourth threshold within a runtime of the second timer, determine that the uplink service volume of the UE within the second detection time is greater than the fourth threshold, where the runtime of the second timer is equal to the second detection time.

The UE in this embodiment may be configured to perform the method in Embodiment 5. Their specific implementations and technical effects are similar. Details are not described herein again.

Embodiment 19 of this application provides a network-side device. For a structure of the network-side device provided in this embodiment, refer to the network-side device shown in FIG. 11.

A receiver 52 is configured to receive a third switching request message sent by UE, where the third switching request message is used to request the network-side device to switch a state of the UE from the ecology conservation optimization to the connected state.

A processor 51 is configured to determine, based on the third switching request, to switch the state of the UE from the ecology conservation optimization to the connected state.

A transmitter 53 is configured to send a third switching response message to the UE, where the third switching response message is used to instruct the UE to switch the state from the ecology conservation optimization to the connected state. Optionally, the third switching response message may carry third indication information. The third indication information may be used to instruct the UE to switch to the connected state.

The network-side device in this embodiment may be configured to perform the method in Embodiment 4. Their specific implementations and technical effects are similar. Details are not described herein again.

Embodiment 20 of this application provides a network-side device. For a structure of the network-side device provided in this embodiment, refer to the network-side device shown in FIG. 11. The network-side device is configured as follows.

A receiver 52 is configured to receive a fourth switching request message sent by UE, where the fourth switching request message is used to request the network-side device to switch a transmission mode of the UE from the uplink contention-based transmission mode to the uplink scheduling-based transmission mode.

A processor 51 is configured to determine, based on the fourth switching request message, to switch the transmission mode of the UE from the uplink contention-based transmission mode to the uplink scheduling-based transmission mode.

A transmitter 53 is configured to send a fourth switching response message to the UE, where the fourth switching response message is used to instruct the UE to switch the transmission mode from the uplink contention-based transmission mode to the uplink scheduling-based transmission mode. Optionally, the fourth switching response message may carry fourth indication information. The fourth indication information may be used to instruct the UE to switch the transmission mode from the uplink contention-based transmission mode to the uplink scheduling-based transmission mode.

The network-side device in this embodiment may be configured to perform the method in Embodiment 5. Their specific implementations and technical effects are similar. Details are not described herein again.

Embodiment 21 of this application provides a computer-readable medium. The computer-readable medium includes a computer-executable instruction. The computer-executable instruction is used to enable UE to perform operations of the UE in the method in any one of Embodiment 1 to Embodiment 5 of this application.

Embodiment 22 of this application provides a computer-readable medium. The computer-readable medium includes a computer-executable instruction. The computer-executable instruction is used to enable a network-side device to perform operations of the network-side device in the method in any one of Embodiment 1 to Embodiment 5 of this application.

Figure 13:
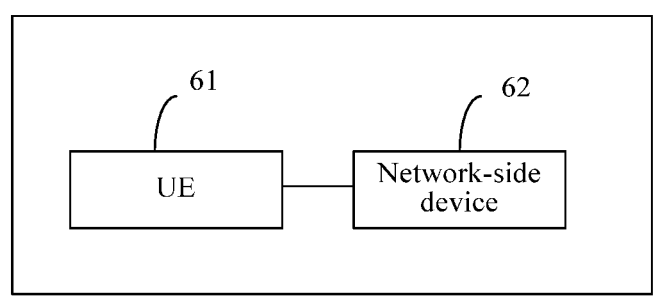
FIG. 13 is a schematic structural diagram of a communications system according to Embodiment 23 of this application.

FIG. 13 is a schematic structural diagram of a communications system according to Embodiment 23 of this application. As shown in FIG. 13, the communications system includes UE 61 and a network-side device 62. The UE 61 is configured to perform the method provided in any one of Embodiment 1 to Embodiment 5. The network-side device 62 is configured to perform the method provided in any one of Embodiment 1 to Embodiment 5.

An embodiment of this application provides an on-chip system. The system is applicable to UE. The on-chip system includes at least one communications interface, at least one processor, and at least one memory. The communications interface, the memory, and the processor are connected to each other by using a bus. The processor executes an instruction stored in the memory, so that the UE can perform operations of the UE in the methods provided in Embodiment 1 to Embodiment 5 of this application.

An embodiment of this application provides an on-chip system. The system is applicable to a network-side device. The on-chip system includes at least one communications interface, at least one processor, and at least one memory. The communications interface, the memory, and the processor are connected to each other by using a bus. The processor executes an instruction stored in the memory, so that the network-side device can perform operations of the network-side device in the methods provided in Embodiment 1 to Embodiment 5 of this application.

In the plurality of embodiments provided in this application, it should be understood that the disclosed apparatus and method may be implemented in other manners. For example, the apparatus embodiment described above is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

The foregoing integrated unit implemented in a form of a software functional unit may be stored in a computer-readable storage medium. The software functional unit is stored in a storage medium and includes several instructions for enabling a computer device (which may be a personal computer, a server, or a network device) or a processor to perform some of the steps of the methods described in the embodiments of this application. The foregoing storage medium includes: any medium that can store program code, for example, a USB flash drive, a removable hard disk, a read-only memory (ROM for short), a random access memory (RAM for short), a magnetic disk, or an optical disc.

What is claimed is:

1. A method, comprising:
    determining, by a wireless terminal in a connected state, whether an uplink service volume of the wireless terminal within a first detection time is less than a first threshold; and
    based at least on determining that the uplink service volume is less than the first threshold:
        switching, by the wireless terminal, a state of the wireless terminal from the connected state to an ecology conservation optimization state; and
        switching, by the wireless terminal, a transmission mode of the wireless terminal from an uplink scheduling-based transmission mode to an uplink contention-based transmission mode.

2. The method according to claim 1, wherein switching the state of the wireless terminal from the connected state to the ecology conservation optimization state comprises:
    sending, by the wireless terminal to a network-side device, a first switching request message requesting the network-side device to switch the state of the wireless terminal from the connected state to the ecology conservation optimization state;
    receiving, by the wireless terminal from the network-side device, a first switching response message based on the first switching request message; and
    switching, by the wireless terminal based on the first switching response message, the state of the wireless terminal from the connected state to the ecology conservation optimization state.

3. The method according to claim 2, wherein the first switching request message comprises first switching indication information, and the first switching indication information indicates that the first switching request message requests the network-side device to switch the state of the wireless terminal from the connected state to the ecology conservation optimization state.

4. The method according to claim 2, wherein the first switching request message comprises information about the uplink service volume of the wireless terminal within the first detection time.

5. The method according to claim 1, wherein switching the transmission mode from the uplink scheduling-based transmission mode to the uplink contention-based transmission mode comprises:
    sending, by the wireless terminal to a network-side device, a second switching request message requesting the network-side device to switch the transmission mode of the wireless terminal from the uplink scheduling-based transmission mode to the uplink contention-based transmission mode;
    receiving, by the wireless terminal from the network-side device, a second switching response message based on the second switching request message; and
    switching, by the wireless terminal based on the second switching response message, the transmission mode of the wireless terminal from the uplink scheduling-based transmission mode to the uplink contention-based transmission mode.

6. The method according to claim 5, wherein the second switching request message comprises second switching indication information, and the second switching indication information indicates that the second switching request message requests the network-side device to switch the transmission mode of the wireless terminal from the uplink scheduling-based transmission mode to the uplink contention-based transmission mode.

7. The method according to claim 5, wherein the second switching request message comprises information about the uplink service volume of the wireless terminal within the first detection time.

8. The method according to claim 1, wherein the uplink service volume of the wireless terminal within the first detection time comprises:
    a first size of first data in an uplink buffer of the wireless terminal to be transmitted within the first detection time,
    a second size of second data in the uplink buffer of the wireless terminal to be transmitted within each scheduling period of the first detection time,
    a third size of an uplink data packet sent by the wireless terminal each time within the first detection time,
    a first service volume of an application within the first detection time,
    a second service volume of a service within the first detection time,
    a first volume of data transmitted on a logical channel within the first detection time, or
    a second volume of data transmitted in a logical channel group within the first detection time.

9. A wireless terminal, comprising:
    a processor, configured to:
        determine, when the wireless terminal is in a connected state, whether an uplink service volume of the wireless terminal within a first detection time is less than a first threshold; and
        based at least on determining that the uplink service volume is less than the first threshold:
            switch a state of the wireless terminal from the connected state to an ecology conservation optimization state; and
            switch a transmission mode of the wireless terminal from an uplink scheduling-based transmission mode to an uplink contention-based transmission mode.

10. The wireless terminal according to claim 9, further comprising:
    a transmitter, configured to send, to a network-side device, a first switching request message requesting the network-side device to switch the state of the wireless terminal from the connected state to the ecology conservation optimization state; and
    a receiver, configured to receive, from the network-side device, a first switching response message based on the first switching request message; and
    wherein the processor is further configured to switch the state of the wireless terminal from the connected state to the ecology conservation optimization state based on the first switching response message.

11. The wireless terminal according to claim 10, wherein the first switching request message comprises first switching indication information, and the first switching indication information indicates that the first switching request message requests the network-side device to switch the state of the wireless terminal from the connected state to the ecology conservation optimization state.

12. The wireless terminal according to claim 10, wherein the first switching request message comprises information about the uplink service volume of the wireless terminal within the first detection time.

13. The wireless terminal according to claim 9, further comprising:
- a transmitter; and
- a receiver;
- wherein the transmitter is configured to send, to a network-side device, a second switching request message requesting the network-side device to switch the transmission mode of the wireless terminal from the uplink scheduling-based transmission mode to the uplink contention-based transmission mode;
- wherein the receiver is configured to receive, from the network-side device, a second switching response message based on the second switching request message; and
- wherein the processor is further configured to switch the transmission mode of the wireless terminal from the uplink scheduling-based transmission mode to the uplink contention-based transmission mode based on the second switching response message.

14. The wireless terminal according to claim 13, wherein the second switching request message comprises second switching indication information, and the second switching indication information indicates that the second switching request message requests the network-side device to switch the transmission mode of the wireless terminal from the uplink scheduling-based transmission mode to the uplink contention-based transmission mode.

15. The wireless terminal according to claim 13, wherein the second switching request message comprises information about the uplink service volume of the wireless terminal within the first detection time.

16. The wireless terminal according to claim 9, wherein the uplink service volume of the wireless terminal within the first detection time comprises:
- a first size of first data in an uplink buffer of the wireless terminal to be transmitted within the first detection time,
- a second size of second data in the uplink buffer of the wireless terminal to be transmitted within each scheduling period of the first detection time,
- a third size of an uplink data packet sent by the wireless terminal each time within the first detection time,
- a first service volume of an application within the first detection time,
- a second service volume of a service within the first detection time,
- a first volume of data transmitted on a logical channel within the first detection time, or
- a second volume of data transmitted in a logical channel group within the first detection time.

17. A non-transitory computer-readable storage medium storing a program that, when executed by one or more processors of a wireless terminal, causes the one or more processors of the wireless terminal to perform steps including:
- determining, when the wireless terminal is in a connected state, whether an uplink service volume of the wireless terminal within a first detection time is less than a first threshold; and
- based at least on determining that the uplink service volume is less than the first threshold:
  - switching a state of the wireless terminal from the connected state to an ecology conservation optimization state; and
  - switching a transmission mode of the wireless terminal from an uplink scheduling-based transmission mode to an uplink contention-based transmission mode.

18. The non-transitory computer-readable storage medium according to claim 17, wherein switching the state of the wireless terminal from the connected state to the ecology conservation optimization state comprises:
- sending, to a network-side device, a first switching request message requesting the network-side device to switch the state of the wireless terminal from the connected state to the ecology conservation optimization state;
- receiving, from the network-side device, a first switching response message based on the first switching request message; and
- switching, based on the first switching response message, the state of the wireless terminal from the connected state to the ecology conservation optimization state.

19. The non-transitory computer-readable storage medium according to claim 18, wherein the first switching request message comprises first switching indication information, and the first switching indication information indicates that the first switching request message requests the network-side device to switch the state of the wireless terminal from the connected state to the ecology conservation optimization state.

* * * * *